US008705530B2

(12) United States Patent
Napierala

(10) Patent No.: US 8,705,530 B2
(45) Date of Patent: Apr. 22, 2014

(54) METHODS AND APPARATUS TO IMPLEMENT MULTIPOINT AND REPLICATED COMMUNICATION PATHS USING UPSTREAM AND RECURSIVE DOWNSTREAM LABEL MAPPINGS

(75) Inventor: Maria Napierala, Ocean, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 601 days.

(21) Appl. No.: 12/845,835

(22) Filed: Jul. 29, 2010

(65) Prior Publication Data

US 2012/0027013 A1   Feb. 2, 2012

(51) Int. Cl.
 *H04L 12/28* (2006.01)
(52) U.S. Cl.
 USPC .......................................... 370/390; 370/432
(58) Field of Classification Search
 USPC ........... 370/390, 255, 351; 709/238, 243, 244
 See application file for complete search history.

(56) References Cited

U.S. PATENT DOCUMENTS

| 6,697,361 | B2 | 2/2004 | Fredette et al. |
| 6,707,796 | B1 | 3/2004 | Li |
| 7,519,010 | B1 | 4/2009 | Aggarwal et al. |
| 7,522,599 | B1 | 4/2009 | Aggarwal et al. |
| 7,522,600 | B1 | 4/2009 | Aggarwal et al. |
| 7,558,263 | B1 | 7/2009 | Aggarwal et al. |
| 7,564,806 | B1 | 7/2009 | Aggarwal et al. |
| 7,570,604 | B1 | 8/2009 | Aggarwal et al. |
| 7,570,605 | B1 | 8/2009 | Aggarwal et al. |
| 7,839,862 | B1* | 11/2010 | Aggarwal .................. 370/395.3 |
| 7,948,986 | B1* | 5/2011 | Ghosh et al. .................. 370/392 |
| 2006/0187950 | A1 | 8/2006 | Bou-Diab et al. |
| 2007/0133564 | A1* | 6/2007 | Chun et al. ............... 370/395.51 |
| 2009/0279544 | A1 | 11/2009 | Ayanampudi et al. |
| 2011/0286456 | A1* | 11/2011 | Kompella ..................... 370/390 |
| 2012/0195312 | A1* | 8/2012 | Wijnands et al. ............. 370/390 |

OTHER PUBLICATIONS

Wijnands, et al., "Using mLDP through a Backbone where there is no Route to the Root," Internet Engineering Task Force (IETF) Network Working Group, Oct. 21, 2008, 10 pages.
Wijnands, et al., "Using mLDP through a Backbone where there is no Route to the Root," Internet Engineering Task Force (IETF) Network Working Group, Apr. 16, 2010, 12 pages.

* cited by examiner

*Primary Examiner* — Yemane Mesfin
*Assistant Examiner* — Henry Baron
(74) *Attorney, Agent, or Firm* — Hanley, Flight & Zimmerman, LLC

(57) ABSTRACT

Methods and apparatus to implement multipoint and replicated communication paths using upstream and recursive downstream label mappings are disclosed. An example method to aggregate multipoint communication paths disclosed herein comprises sending an upstream label assignment request to an upstream router in response to receiving a first downstream message for building a first inner multipoint communication path between a root node identified in the first downstream message and a leaf node originating the first downstream message, and receiving an upstream-assigned label from the upstream router in response to the upstream label assignment request, the upstream-assigned label to identify the first inner multipoint communication path among a plurality of inner multipoint communication paths conveyed via an outer multipoint communication path aggregating the plurality of inner multipoint communication paths.

20 Claims, 22 Drawing Sheets

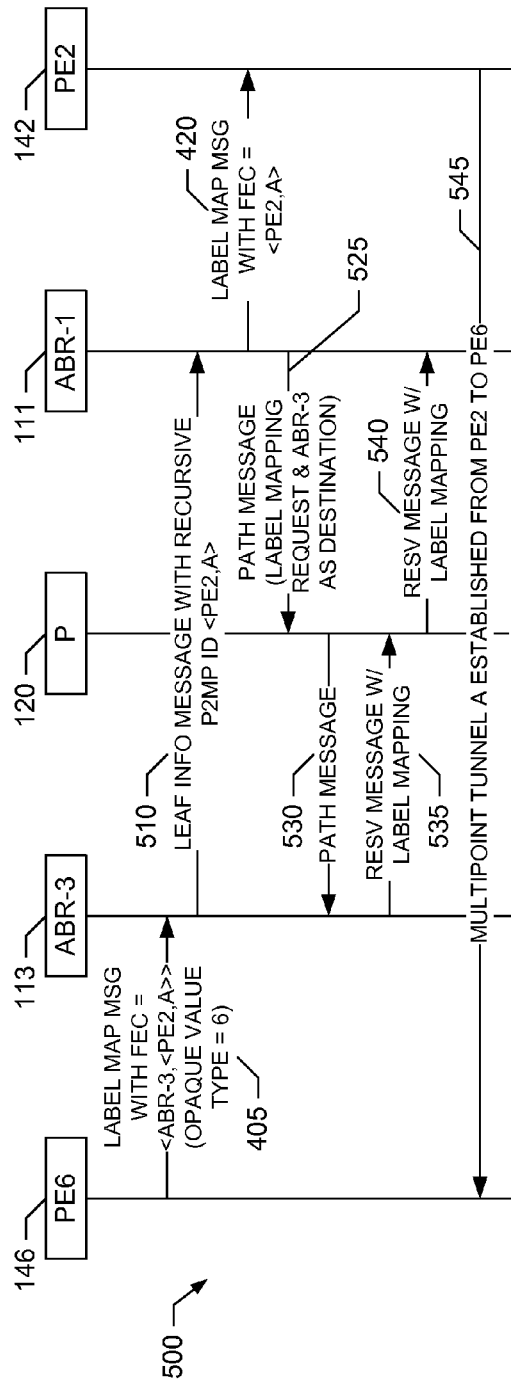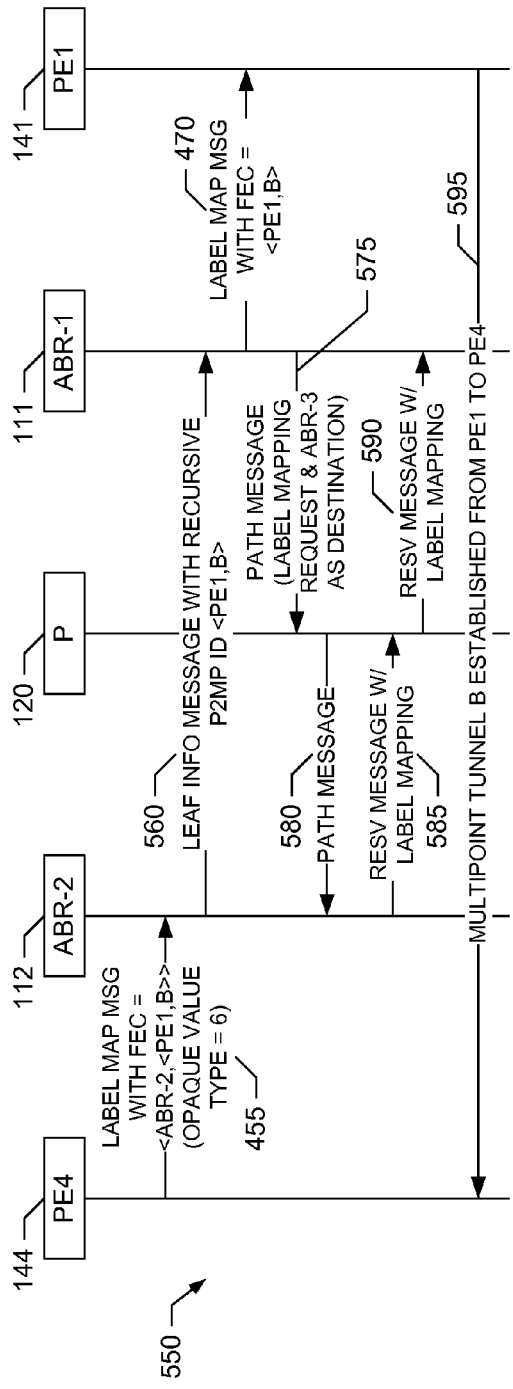

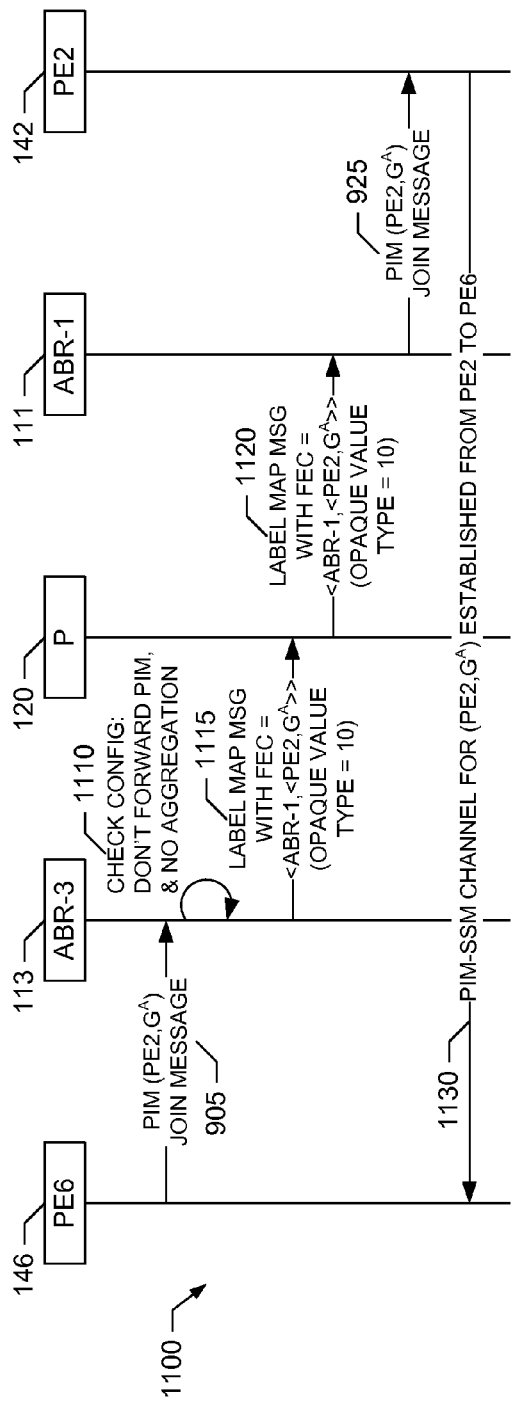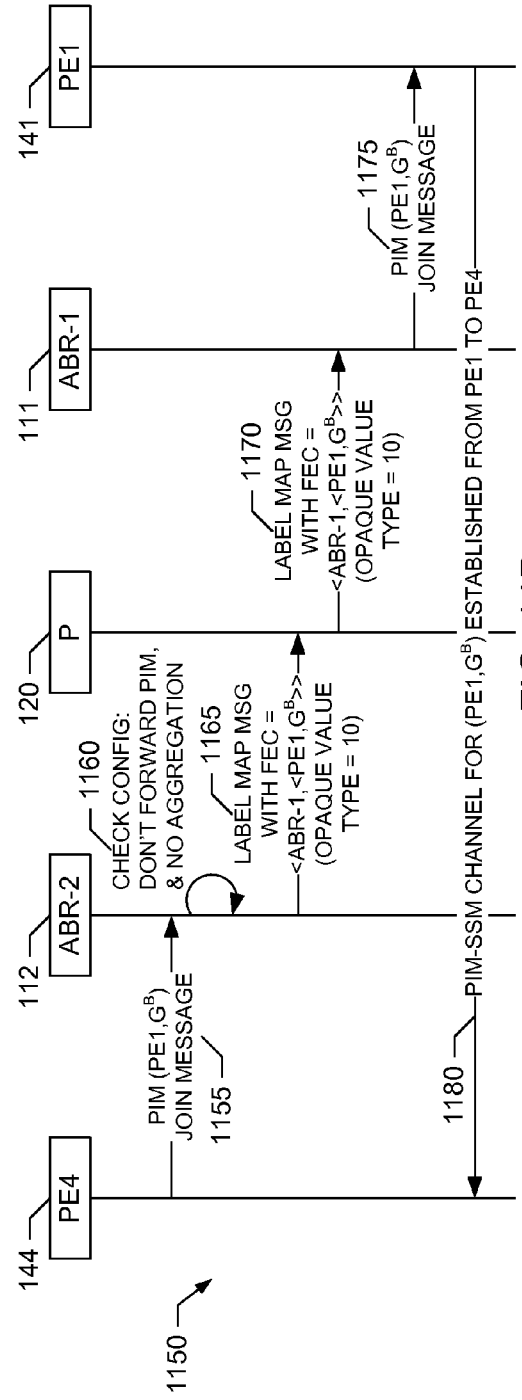

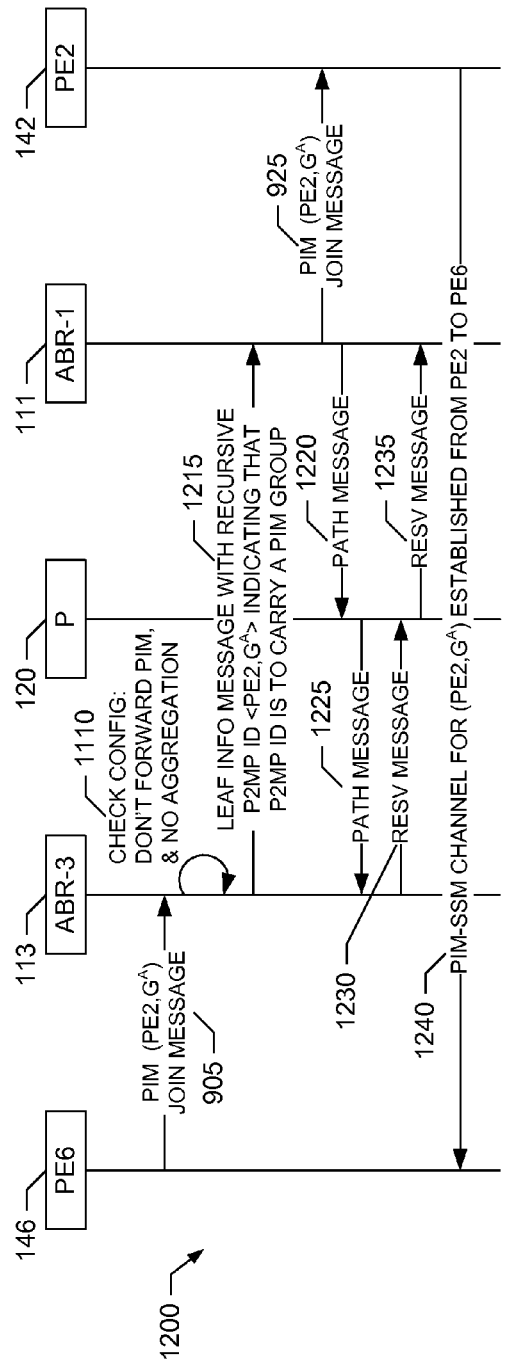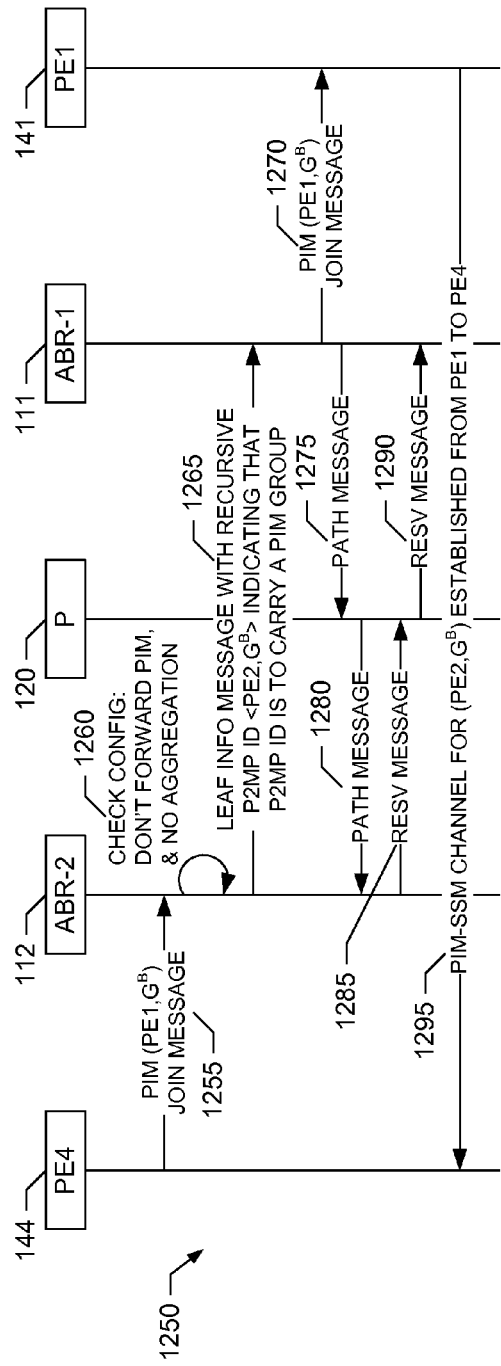

METHODS AND APPARATUS TO IMPLEMENT MULTIPOINT AND REPLICATED COMMUNICATION PATHS USING UPSTREAM AND RECURSIVE DOWNSTREAM LABEL MAPPINGS

FIELD OF THE DISCLOSURE

This disclosure relates generally to communication networks and, more particularly, to methods and apparatus to implement multipoint and replicated communication paths using upstream and recursive downstream label mappings.

BACKGROUND

In many service provider communication networks, provider edge (PE) routers provide the interfaces between customer premises equipment (CPE) and the provider network. The PE routers, in turn, directly or indirectly interface with area border routers (ABRs) that define the interfaces between edge segments of the provider network containing the CPE and PE routers (which are also referred to as edge networks), and the core segment of the provider network (which is also referred to as the core network). The combination of a core network and its associated edge networks is referred to as a domain or an autonomous system (AS). Furthermore, a provider network may include multiple autonomous systems or domains that are interconnected via autonomous system boundary routers (ASBRs).

In an example provider network, the core network is implemented using multiprotocol label switching (MPLS) that employs label switched paths (LSPs) to create communication paths between label switch routers (LSRs). The LSRs can be used to implement the ABRs, the provider (P) routers in the core network that interconnect the ABRs, and also the PE routers and ASBRs mentioned above. LSPs utilize labels for path identification, with switching being distributed among LSRs via point-to-point and/or multipoint label distribution protocols, such as label distribution protocol (LDP) and multicast LDP (mLDP), resource reservation protocol-traffic engineering (RSVP-TE) and RSVP-TE point-to-multipoint (P2MP), etc. A point-to-point LSP implements a communication path (also referred to as a tunnel) to enable traffic to be forwarded from a head-end node (e.g., such as a head-end LSR, which may be implementing a head-end PE router) for delivery to a single tail-end node (e.g., such as a tail-end LSR, which may be implementing a tail-end PE router). A multipoint LSP implements a multipoint communication path or tunnel to enable traffic to be forwarded from, for example, a root node (e.g., such as a root LSR, which may be implementing a root PE router) for delivery to multiple leaf nodes (e.g., such as multiple leaf LSRs, which may be implementing multiple leaf PE routers). Ingress replication is another technique that can be used to forward traffic (e.g., via replication) from a root node for delivery to multiple leaf nodes.

BRIEF DESCRIPTION OF THE DRAWINGS

FIGS. 5A-B collectively illustrate example message sequence diagrams representing configuration of individual multipoint communication paths in the communication system of FIG. 1 using resource reservation protocol-traffic engineering (RSVP-TE) point-to-multipoint (P2MP) messaging.

FIGS. 11A-B collectively illustrate example message sequence diagrams representing configuration of individual multipoint communication paths supporting a legacy multicast protocol in the communication system of FIG. 1 using mLDP messaging.

FIGS. 12A-B collectively illustrate example message sequence diagrams representing configuration of individual multipoint communication paths supporting a legacy multicast protocol in the communication system of FIG. 1 using RSVP-TE P2MP messaging.

DETAILED DESCRIPTION

Figure 1:
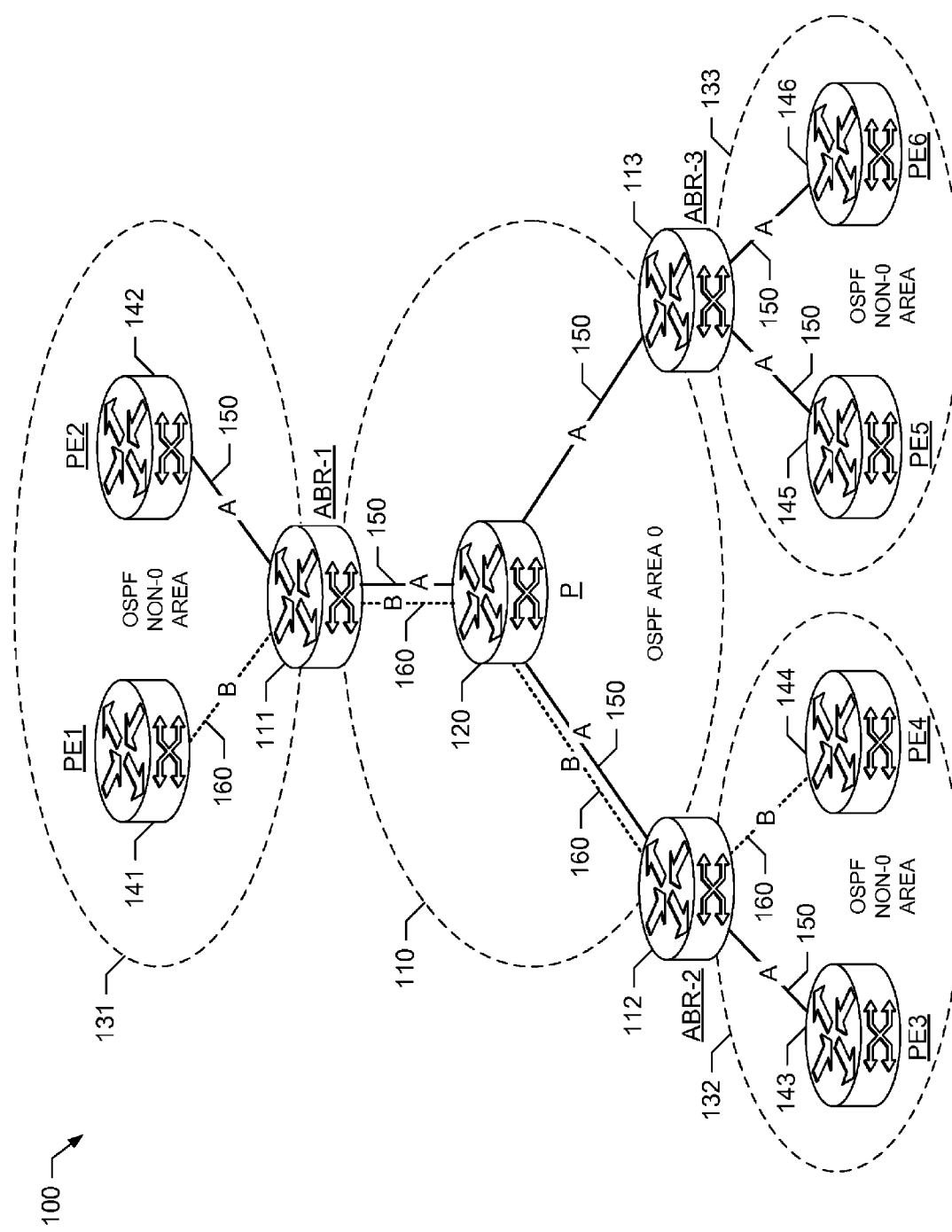
FIG. 1 is block diagram of an example autonomous communication system supporting multipoint communication paths.

Methods, apparatus and articles of manufacture to implement multipoint and replicated communication paths using upstream and recursive downstream label mappings are disclosed herein. Although the following discloses example methods, apparatus and articles of manufacture including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Additionally, though described in connection with example routers, access points and other network structures and devices, the example methods, apparatus and articles of manufacture described herein are not limited to implementations using such entities. Accordingly, while the following describes example methods, apparatus and articles of manufacture, it will readily be appreciated that the examples provided are not the only way to implement such methods, apparatus and articles of manufacture. Also, wherever possible, the same reference numbers will be used throughout the drawing(s) and accompanying written description to refer to the same or like parts.

The example methods, apparatus and articles of manufacture disclosed herein can provide many benefits over prior techniques for implementing communication paths in a provider network. For example, the methods, apparatus and articles of manufacture disclosed herein can be used to build multipoint communication paths (e.g., LSPs) and/or perform ingress replication for recursive delivery of multicast traffic from a root node to a set of leaf nodes over a provider network or segments of a network where, for example, the complete route to the root node is unknown. Additionally, the example methods, apparatus and articles of manufacture disclosed herein can be used to build multipoint communication paths (e.g., LSPs) with or without aggregation in the core network (e.g., the core segment of the provider network). Furthermore, in the case of aggregation in the core network, the example methods, apparatus and articles of manufacture disclosed herein enable aggregation of multiple, inner multipoint communication paths (e.g., LSPs) into an outer multipoint communication paths (e.g., LSP) without requiring the core network to maintain state information for each of the inner multipoint communication paths. This can reduce the number of multicast paths/tunnels that need to be tracked within the core network. The example methods, apparatus and articles of manufacture disclosed herein also enable multicast traffic sent from a root node to multiple leaf nodes to be ingress replicated (possibly recursively) over edge and/or core segments of the provider network without requiring those segments to be multicast enabled. (As used herein, the terms "multipoint" and "multicast" are interchangeable unless noted otherwise.) Other capabilities and features of the example disclosed methods, apparatus and articles of manufacture are described in greater detail below.

A block diagram of an example provider network 100 supporting multipoint communication paths (e.g., LSPs) for recursive delivery of multicast traffic from a root node to a set of leaf nodes is illustrated in FIG. 1. The provider network 100 corresponds to an autonomous system (AS) that includes an example core network 110 with three example ABRs 111, 112 and 113 (also labeled as ABR-1, ABR-2 and ABR-3, respectively, in FIG. 1) interconnected via an example P router 120 (also labeled as P in FIG. 1). In the following, a reference to a particular item illustrated in a figure (e.g., such as a router or a communication path) can be by way of its textual label, its reference numeral or both its textual label followed by its associated reference numeral in parenthesis.

One or more of the ABRs 111, 112, 113, and/or the P router 120 can be implemented by any type or router, bridge, network node, server, etc. Alternatively, one or more of the ABRs 111, 112, 113, and/or the P router 120 can be implemented by one or more processing systems, such as the processing system 2800 of FIG. 20, which is described in greater detail below. As described in greater detail below, at least some of the example methods, apparatus and articles of manufacture disclosed herein are implemented via the ABRs 111, 112, 113.

In the illustrated example, the core network 110 implements the open shortest path first (OSPF) routing protocol. Accordingly, the core network 110 is also referred to as OSPF area 0. The ABRs 111, 112, 113 included in the core network 110 provide interfaces between the core network 110 and example edge networks 131, 132 and 133, which are also referred to as the OSPF non-0 areas of the provider network 100. The edge network 131 includes two example PE routers 141 and 142 (also labeled as PE1 and PE2, respectively, in FIG. 1) that interface with ABR-1 (111). Similarly, the edge network 132 includes two example PE routers 143 and 144 (also labeled as PE3 and PE4, respectively, in FIG. 1) that interface with ABR-2 (112), and the edge network 133 includes two example PE routers 145 and 146 (also labeled as PE5 and PE6, respectively, in FIG. 1) that interface with ABR-3 (113). One or more of the PE routers 141, 142, 143, 144, 145, 146 can be implemented by any type or router, bridge, network node, server, etc. Alternatively, one or more of the PE routers 141, 142, 143, 144, 145, 146 can be implemented by one or more processing systems, such as the processing system 2800 of FIG. 20, which is described in greater detail below. The CPE included in the each of the edge networks 131, 132, 133 and coupled to each of the PE routers 141, 142, 143, 144, 145, 146 is omitted for clarity.

The provider network 100 of FIG. 1 includes one core network, three edge networks, one P router, three ABRs and six PE routers. However, the example methods, apparatus and articles of manufacture disclosed herein are not limited to implementation in such a provider network. Instead, the example methods, apparatus and articles of manufacture disclosed herein can be implemented in provider networks including any number of core networks, edge networks, P routers, ABRs, PE routers, etc.

In the illustrated example of FIG. 1, the provider network 100 implements two intra-AS multipoint communication paths 150 and 160 (also labeled as A and B, respectively, in FIG. 1). The root PE of the multipoint communication path A (150) is PE2 (142), and its leaf PEs are PE3 (143), PE5 (145) and PE6 (146). The root PE of the multipoint communication path B (160) is PE1 (141) and its leaf PE is PE4 (144). Accordingly, ABR-1 (111) is a root ABR, and ABR-2 (132) and ABR-3 (133) are leaf ABRs. As such, ABR-1 (111) is upstream of ABR-2 (132) and ABR-3 (133), whereas ABR-2 (132) and ABR-3 (133) are each downstream of ABR-1 (111).

The provider network 100 enables multipoint communication paths to be built from leaf PEs (and from leaf nodes coupled to the leaf PEs) to the associated root PEs (and to the root nodes coupled to the root PEs) recursively. Thus, a complete route from a leaf PE to the root PE of the multipoint communication path does not need to exist as long as the leaf PE has a route to an intermediate network node (e.g., such as an intermediate ABR or ASBR) towards the root PE. For example, if the border gateway protocol (BGP) is used to implement the provider network, such a route to an intermediate network node corresponds to the BGP next-hop towards the root PE.

In the provider network 100, LSPs are used to implement the multipoint communication paths A (150) and B (160). Any multipoint label distribution protocol, such as mLDP, RSVP-TE P2MP, etc., can be used to build the multipoint communication paths A (150) and B (160) recursively without requiring a complete route through the network from the leaf PE to the root PE. For example, to build the multipoint communication path A (150), also referred to as the multipoint LSP A (150), from leaf PE6 (146) to root PE2 (142) using mLDP, the leaf PE6 (146) sends a downstream-assigned label mapping with a recursive mLDP forwarding equivalence class (FEC) to its BGP next-hop LSR towards the root PE2 (142), which is ABR-3 (113) in the illustrated example. The recursive mLDP FEC identifies at least the following information (1) an LSR (e.g., such as an ABR or ASBR) that is an intermediate network node along the path towards the root node, (2) the original root LSR (e.g., such as a root PE router), and the tunnel identifier (ID) of the multipoint tunnel the leaf LSR (e.g., such as a leaf PE router) is joining. In this example, the intermediate node, also referred to as the intermediate root node of the mLDP FEC, is ABR-3 (113), the original root LSR is PE2 (142) and the tunnel ID identifies tunnel A (150). In some examples, the mLDP FEC employs a recursive tunnel identifier (also referred to as a recursive FEC) that is a tuple having the form <ABR, <root PE, tunnel ID>> to represent intermediate root node (ABR), the original root node (root PE) and the tunnel ID. For example, to build the multipoint communication path A (150), leaf PE6 (146) sends a recursive FEC in the form of <ABR-3, <PE2, A>>.

The leaf PE6 (146) can send the downstream-assigned label mapping with the recursive FEC to the indicated intermediate root node directly (e.g., via a targeted mLDP session) or indirectly (e.g., via one or more intermediate LSRs). When an LSR (e.g., such as an ABR or ASBR) receives the downstream-assigned label mapping with the recursive FEC, the LSR determines whether it is the identified intermediate root node and whether it has a complete route to the original root LSR (e.g., such as a root PE router). For example, the receiving LSR has a complete route to the root LSR if its BGP next-hop to the root is the root LSR itself. If the receiving LSR is the identified intermediate root node but it does not have a complete route to the original root LSR, the receiving LSR (which is referred to as a downstream LSR) changes the intermediate root node in the mLDP FEC to identify another LSR (which is referred to as an upstream LSR) that is the upstream next-hop towards the original LSR. For example, upon receiving from PE6 (146) an mLDP recursive FEC in the form of <ABR-3, <PE2, A>>, ABR-3 (113) changes the recursive FEC to be <ABR-1, <PE2, A>>, because relative to the downstream router ABR-3 (113), ABR-1 (111) is the upstream next-hop towards the root PE6 (146).

If, however, the receiving LSR has a complete route to the original root LSR, the receiving LSR changes the mLDP FEC to remove reference to any intermediate root node, thereby leaving the root LSR and tunnel ID for the multipoint communication path being established. For example, upon receiving an mLDP recursive FEC in the form of <ABR-1, <PE2, A>> from ABR-3 (113), ABR-1 (111) determines that it has a route to the PE2 (142), which is the original root of the multipoint communication path A (150). Accordingly, ABR-1 (111) removes the reference to ABR-1 from the mLDP recursive FEC, and sends a downstream-assigned label mapping with a FEC in the form of <PE2, A> to PE2 (142) to complete building of the multipoint communication path A (150).

As another example, to build the multipoint communication path A (150) from leaf PE6 (146) to root PE2 (142) using RSVP-TE P2MP, the leaf PE6 (146) sends a leaf information (Leaf Info) message with a recursive P2MP identifier (P2MP ID) to its BGP next-hop LSR towards the root PE2 (142), which is ABR-3 (113) in the illustrated example. Similar to a recursive mLDP FEC, the Leaf Info message includes a recursive identifier that identifies an LSR (e.g., ABR or ASBR) that is the intermediate root node, and also identifies the root LSR (e.g., root PE router) and the tunnel ID (e.g., P2MP ID) of the multipoint tunnel the leaf LSR (e.g., leaf PE router) is joining in the form of a tuple represented as <root PE, P2MP ID>, which is <PE2, A> in this example. The Leaf Info message can be implemented as an LDP message sent over a targeted LDP session between PE6 (146) and ABR-3 (113), or via a BGP route exchanged between PE6 (146) and ABR-3 (113).

As in the case of receiving a downstream-assigned label mapping with a recursive FEC, when an LSR (e.g., such as an ABR or ASBR) receives a Leaf Info message, the LSR determines whether it is the identified intermediate root node and whether it has a complete route to the original root LSR (e.g., such as a root PE router). If the receiving LSR is the identified intermediate root node but it does not have a complete route to the original root LSR, the receiving LSR changes the intermediate root node of the Leaf Info message to identify the upstream LSR that is the next-hop towards the original root LSR. For example, upon receiving the Leaf Info message from PE6 (146), ABR-3 (113) changes the intermediate root node to be ABR-1 (111), which is the upstream next-hop towards the original root PE2 (142).

If, however, the receiving LSR has a complete route to the original root LSR, the receiving LSR changes the Leaf Info message to remove reference to any intermediate root node, thereby leaving the root LSR and tunnel ID for the multipoint communication path being established. For example, upon receiving a Leaf Info message from ABR-3 (113), ABR-1 (111) determines that it has a route to the PE2 (142), which is the original root of the multipoint communication path A (150). Accordingly, ABR-1 (111) removes the reference to ABR-1 as an intermediate root node from the Leaf Info message, and sends a Leaf Info message with a P2MP ID of <PE2, A> to PE2 (142) to complete building of the multipoint communication path A (150).

The provider network 100 also enables multipoint communication paths to be built using different multipoint label distribution protocols in the core network 110 than in the edge networks 131-133. For example, and as described in greater detail below, a leaf PE in one of the edge networks 131-133 can use mLDP to trigger building of a multipoint communication path by sending an mLDP label mapping with a recursive FEC of the form <ABR, <PE, tunnel ID>> to the upstream next-hop ABR in the particular edge network 131-133. The result is an mLDP LSP formed between the receiving ABR and the originating PE. Next, the receiving ABR can convert the mLDP LSP to a Leaf Info message carrying the recursive P2MP ID=<PE, tunnel ID>, which is sent to another upstream ABR (e.g., via one or more next-hop P routers in the core network 110). The result is an RSVP-TE P2MP LSP implementing the multipoint communication path in the core network 110.

Figure 2:
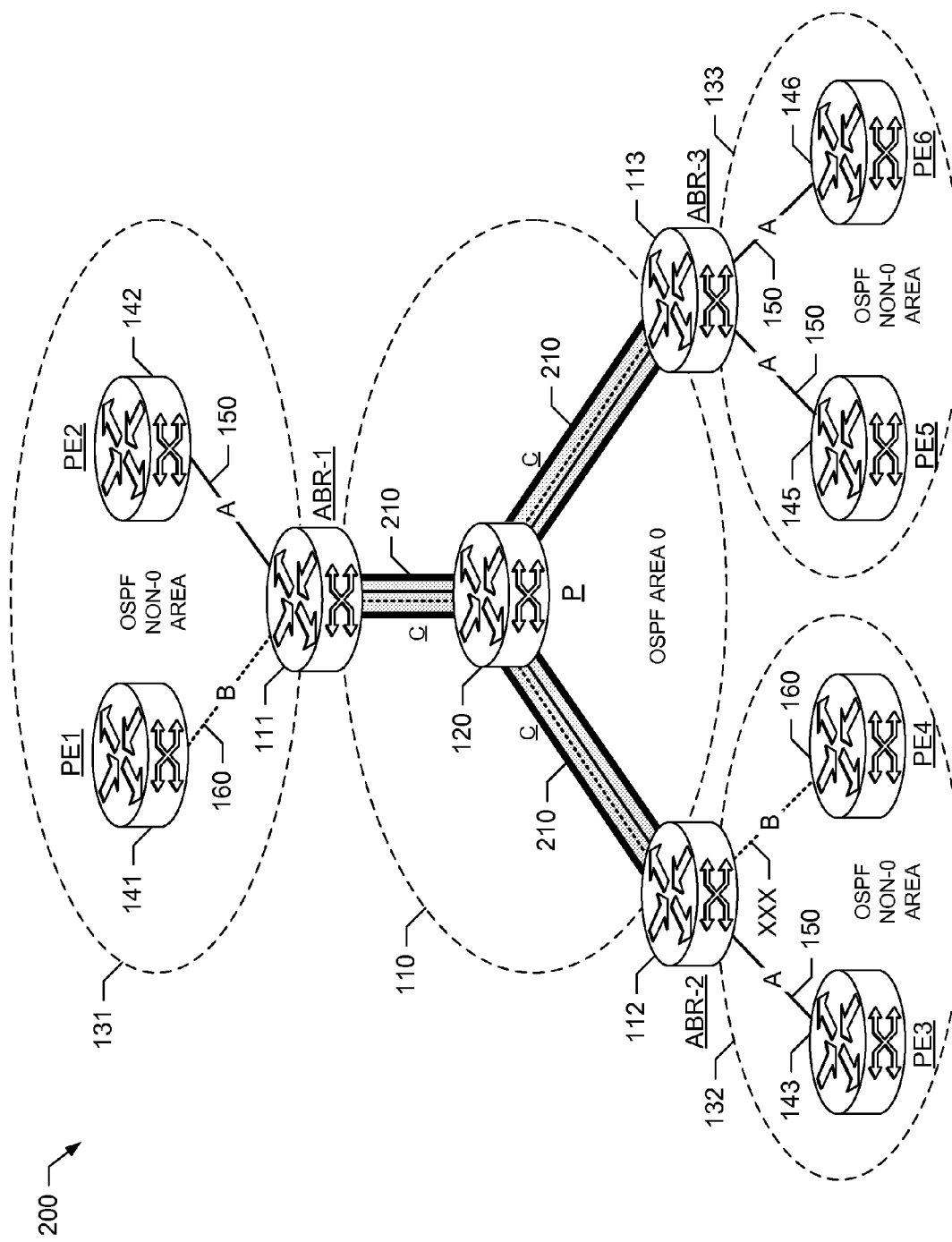
FIG. 2 is a block diagram of the communication system of FIG. 1 when configured to aggregate multipoint communication paths as described herein.

As noted above, the example methods, apparatus and articles of manufacture disclosed herein enable aggregation of multiple, inner multipoint communication paths (e.g., LSPs) into an outer multipoint communication path (e.g., LSP) in a core network without requiring the core network to maintain state information for each of the inner multipoint communication paths (e.g., LSPs). FIG. 2 illustrates an example provider network 200 that corresponds to the provider network 100 when configured to support such aggregation of multipoint communication paths in the core network 110. Like elements in FIGS. 1 and 2 are labeled with the same reference numerals.

To implement intra-AS aggregation of multipoint LSPs in the core network 110 of the provider network 200, an outer multipoint LSP 210 (also labeled as C in FIG. 2) is built to aggregate multiple, inner multipoint LSPs that are rooted at one or more PE routers (e.g., such as the PE routers PE1 and PE2) located in an edge network (e.g., such as the edge network 131) located outside the core network 110. The root of the outer multipoint LSP C (210) is an LSR (e.g., such as ABR-1) that is communicatively coupled to the root PEs (e.g., PE1 and PE2) of the inner multipoint LSPs being aggregated. In the illustrated example, the root ABR-1 (111) of the outer multipoint LSP C (210) assigns a distinct upstream-assigned label to each inner multipoint LSP being aggregated (e.g., such as the inner multipoint LSPs A and B in the illustrated example). The root ABR-1 (111) of the outer multipoint LSP C (210) communicates associated label binding information (e.g., such as the upstream-assigned label and association of the upstream-assigned label to the particular inner LSP) to each leaf LSR (e.g., such as the leaf ABR-2 and the leaf ABR-3) of the outer multipoint LSP C (210). The leaf ABRs (e.g., ABR-2 and ABR-3) of the outer multipoint LSP C (210) use the label binding information received from the root ABR-1 (111) to distinguish among the different inner multipoint LSPs A (150) and B (160) aggregated in the outer multipoint LSP C (210) and to route the inner multipoint LSPs A (150) and B (160) to the appropriate leaf PEs (e.g., such as leaf PE3 through leaf PE 6). Additionally, each leaf ABR (e.g., ABR-2 and ABR-3) can drop (e.g., discard) any traffic provided via those inner multipoint LSPs that do not have a leaf PE coupled to the leaf ABR, thereby preventing the traffic from these inner multipoint LSPs from unnecessarily consuming the bandwidth of the leaf PEs coupled to the leaf ABR.

In some examples, aggregation of inner multipoint LSPs (e.g., such as the multipoint LSPs A and B) into an outer multipoint LSP (e.g., such as the multipoint LSP C) in the core network 110 is triggered by a downstream (leaf) LSR (e.g., such as ABR-3) when it receives a downstream-assigned label mapping with a recursive mLDP FEC or when it receives the Leaf Info message carrying a recursive P2MP ID. As described above, the recursive mLDP FEC or the Leaf Info message with the recursive P2MP ID identifies the root PE (e.g., such as PE2) and the tunnel ID/P2MP ID for the particular inner multipoint LSP (e.g., such as tunnel/path A) the leaf PE (e.g., such as PE6) is requesting to join.

A recursive mLDP FEC can include an opaque value type that identifies the type of multipath tunnel to be built. In some examples, the provider network 200 employs a new opaque value type having a particular value (e.g., such as a value set to "8") to indicate that the inner multipoint LSP identified by the tunnel ID in the mLDP FEC is to be aggregated with other inner multipoint LSPs over the core network 110. When the downstream (leaf) LSR (e.g., such as ABR-3) communicatively coupled to the leaf PE (e.g., such as leaf PE6) receives a downstream-assigned label mapping with the mLDP FEC having an opaque value type=8 (or some other specified value), reception of the mLDP FEC triggers an upstream label assignment request to be sent by the downstream LSR to obtain the upstream-assigned label for identifying the inner multipoint LSP when aggregated into the outer multipoint LSP. Similarly, in the case of RSVP-TE P2MP, when the downstream (leaf) LSR (e.g., such as ABR-3) receives a Leaf Info message for an inner multipoint LSP having an aggregation indicator that is set, reception of such a Leaf Info message also triggers sending of an upstream label assignment request by the downstream LSR. In the provider network 200, the upstream label assignment request message is sent over a targeted LDP (TLDP) session established between the downstream (leaf) LSR (e.g., such as ABR-3) and the upstream (root) LSR (e.g., such as ABR-1) coupled to the root PE (e.g., such as PE2) identified in the received mLDP FEC or in the Leaf Info message. In response to the upstream label assignment request, the upstream (root) LSR (e.g., such as ABR-1) assigns a label (i.e., the upstream-assigned label) for the tunnel ID or P2MP ID identified in the mLDP FEC or Leaf Info message, respectively, and sends the upstream-assigned label to the downstream (leaf) LSR (e.g., such as ABR-3) via the TLDP session. Additionally, in response to the upstream label assignment request, the upstream (root) LSR (e.g., such as ABR-1) continues building the inner multipoint tunnel towards the root PE (e.g., such as PE2) identified in the upstream label assignment request according to the protocol (e.g., mLDP, RSVP-TE P2MP, etc.) used to build tunnels in that edge segment of the network (e.g., such as the edge network 131).

To build the outer multipoint LSP C (210) itself using mLDP, the downstream (leaf) LSR (e.g., such as ABR-3) assigns a downstream-assigned label for the outer multipoint LSP C (210) and sends a label mapping with mLDP FEC=<root ABR, root ABR> in which the root ABR (e.g., such as ABR-1) itself is used as the tunnel ID. In the illustrated example, the downstream (leaf) LSR (e.g., such as ABR-3) sends the label mapping to the neighboring provider (P) router in the core network 110 towards the upstream (root) LSR (e.g., such as ABR-1). In examples where the outer multipoint LSP C (210) is built using RSVP-TE P2MP, the upstream (root) LSR (e.g., such as ABR-1) initiates an RSVP-TE PATH message to add the leaf LSR (e.g., such as ABR-3) to the outer multipoint LSP C (210) rooted at the upstream ABR (such as ABR-1 in this example).

After the inner multipoint LDPs (e.g., such as A and B) and the outer multipoint LSP (e.g., such as C) are built, packets are forwarded from root PEs to leaf PEs in the provider network 200 as follows. When a root LSR (e.g., such as ABR-1) receives a labeled packet from the root PE (e.g., such as PE2) on an inner multipoint LSP (e.g., such as the inner multipoint LSP A), the root LSR (e.g., such as ABR-1) swaps the downstream-assigned label of the inner multipoint LSP with the upstream-assigned label for this inner multipoint LSP. The root LSR (e.g., such as ABR-1) also appends the downstream-assigned label for the outer multipoint LSP (e.g., such as the outer multipoint LSP C) rooted at this LSR. The packet is then switched through the core network 110 using the downstream-assigned label(s) for the outer multipoint LSP and, thus, no knowledge of the state of the inner multipoint LSP is required. Because the upstream-assigned label is in a label space specific to the upstream LSR (e.g., such as ABR-1), penultimate hop popping on the outer multipoint LSP is disabled at the leaf LSRs (e.g., such as the leaf ABR-3). Thus, when the packet is received at the downstream (leaf) LSR (e.g., leaf ABR-3), the leaf LSR processes the upstream-assigned label (rather than just popping the upstream-assigned label) in the context of the outer multipoint LSP to determine whether the associated inner multipoint LSP (e.g., such as the inner multipoint LSP A) has a leaf PE (e.g., such as leaf PE 6) coupled to the leaf LSR (e.g., leaf ABR-3). If so, the leaf LSR pops the outer label corresponding to the outer multipoint LSP off the label stack included with the packet and also swaps the upstream-assigned label for the inner LSP with the downstream-assigned label of the inner LSP assigned by the leaf PE (e.g., such as leaf PE 6) to forward the packet to the leaf PE.

Figure 3:
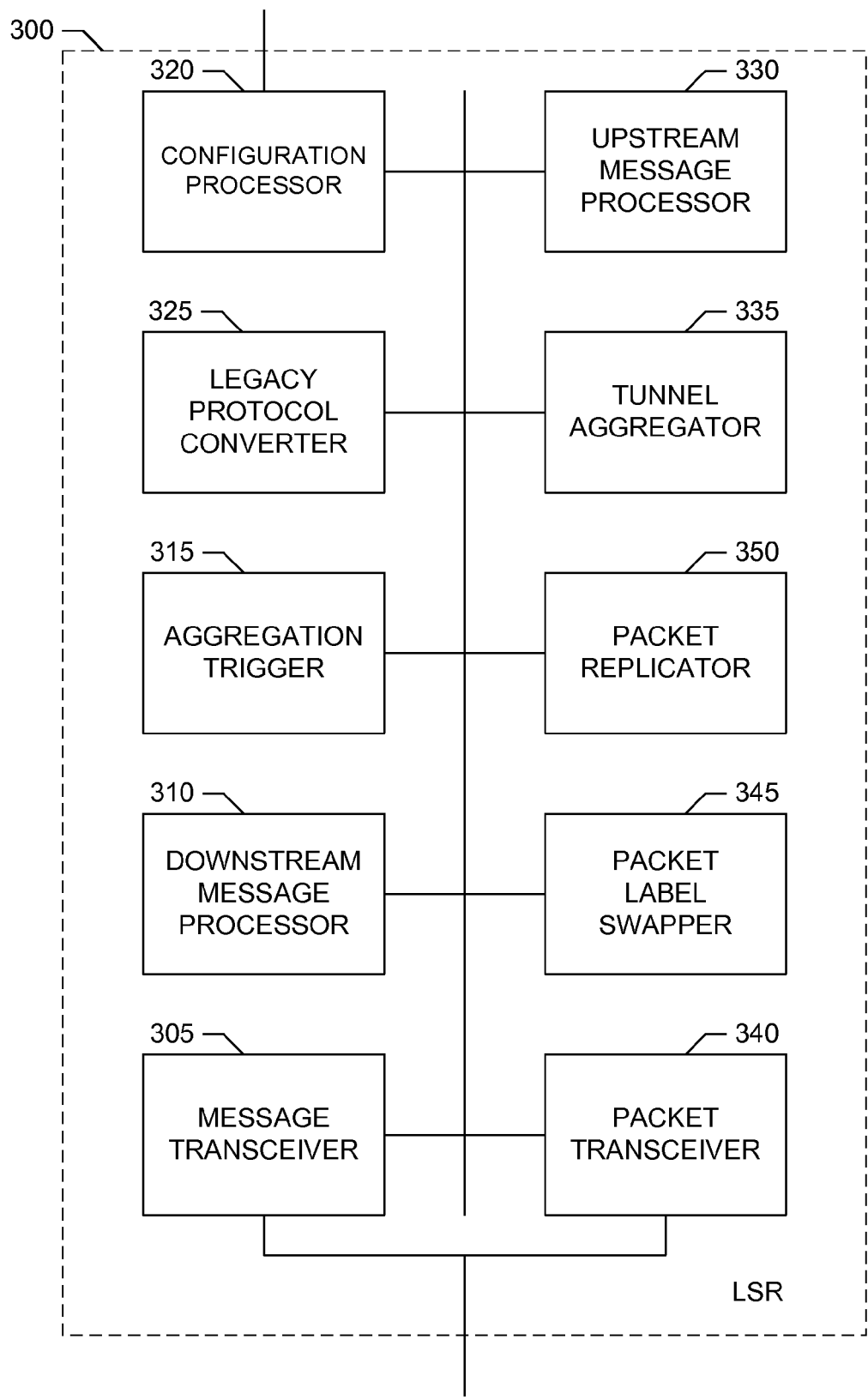
FIG. 3 is a block diagram of an example label switched router (LSR) that may be used to implement area border routers (ABRs) in the communication systems of FIGS. 1, 2 and/or 14.

A block diagram of an example LSR 300 that may be used to implement any of the ABRs (e.g., such as ABR-1, ABR-2 and/or ABR-3) in the provider networks 100 and 200 of FIGS. 1-2 is illustrated in FIG. 3. The LSR 300 may also be used to implement any of the ABRs illustrated in FIG. 14, which is described in greater detail below. The LSR 300 includes an example message transceiver 305 to receive and transmit messages to build communication paths (LSPs) in a provider network. Such messages include, but are not limited to, LDP and mLDP messages, RSVP-TE and RSVP-TE P2MP messages, upstream label assignment request messages, upstream label assignment messages, etc.

The LSR 300 also includes an example downstream message processor 310 to process downstream messages received via the message transceiver 305 and to cause an appropriate response message to be triggered and sent via the message transceiver 305. For example, the downstream message processor 310 can receive and process an mLDP label mapping message and/or RSVP-TE P2MP message from a downstream LSR (e.g., such as a PE router, an ABR, an ASBR, etc.) for building a multipoint LSP. The downstream message processor 310 processes the received message to determine an mLDP label mapping message or RSVP-TE P2MP message to be sent to the next-hop upstream LSR (e.g., such as a PE router, an ABR, an ASBR, etc.) to continue building the multipoint LSP. Additionally, if aggregation is supported and triggered, the downstream message processor 310 processes the received mLDP label mapping message or RSVP-TE P2MP message to determine an appropriate upstream label assignment request to be sent via the message transceiver 305 to an appropriate upstream LSR (e.g., such as a PE router, an ABR, an ASBR, etc.) that is the root of the outer multipoint LSP being used to aggregate multiple inner multipoint LSPs.

To determine whether to trigger aggregation and, thus, trigger the downstream message processor 310 to generate and send an upstream label assignment request to an upstream LSRs to obtain an upstream-assigned label for identifying an inner multipoint LSP aggregated in an outer multipoint LSP, the LSR 300 includes an example aggregation trigger 315. An example configuration processor 320 included in the LSR 300 can be used to configure the aggregation trigger 315 to trigger sending of upstream label assignment requests in response to the LSR 300 receiving certain mLDP label mapping messages (e.g., such as a label mapping message containing a recursive FEC with a particular value for the opaque value type) and/or certain RSVP-TE P2MP messages (e.g., such as a Leaf Info message with an aggregation indicator that is set). Additionally or alternatively, the configuration processor 320 can configure one or more aggregation on/off parameters to, for example, turn aggregation on and cause the aggregation trigger 315 to trigger sending of upstream label assignment requests upon receipt of any message (e.g., mLDP messages, RSVP-TE P2MP messages, legacy protocol messages, etc.) for building multipoint/multicast communication paths.

To support the use of legacy multicasting protocols in certain edge sections of a provider network, the LSR 300 includes an example legacy protocol converter 325. For example, the legacy protocol converter 325 can receive a downstream multicast communication path setup message conforming to a legacy protocol and convert that legacy protocol message to an mLDP message or RSVP-TE P2MP message to be sent to the next-hop upstream LSR to continue building the multicast path as a multipoint LSP in the core network or another edge network in the provider network. Conversely, the legacy protocol converter 325 can receive a downstream mLDP message or RSVP-TE P2MP message and convert it to a legacy protocol message to continue building a multipoint LSP as a legacy multicast communication path.

The LSR 300 also includes an example upstream message processor 330 to process downstream messages received via the message transceiver 305 that result in upstream messages being generated and sent back to originators of the received downstream messages (e.g., also via the message transceiver 305). For example, the upstream message processor 330 can receive an upstream label assignment request from a downstream LSR (e.g., such as a PE router, and ABR, and ASBR, etc.) corresponding to an inner multipoint LSP that is to be aggregated into an outer multipoint LSP rooted at the LSR 300. In response to receiving the upstream label assignment request, the upstream message processor 330 invokes an example tunnel aggregator 335 that determines an upstream-assigned label to identify the inner multipoint LSP corresponding to the received upstream label assignment request when that inner multipoint LSP is aggregated into the outer multipoint LSP. The upstream message processor 330 then sends an upstream label assignment message containing the upstream-assigned label back to the downstream LSR that sent the upstream label assignment request. The downstream LSR uses this upstream-assigned label to identify packets conveyed via the inner multipoint LSP and aggregated into the outer multipoint LSP.

To process data packets corresponding to traffic received and transmitted via established multipoint LSPs, the LSR 300 includes an example packet transceiver 340. In the illustrated example, because the communication packets are received and transmitted via LSPs, each packet includes a label stack containing labels that identify the LSP conveying the packet. Labels are pushed to and popped from the label stack by LSRs as the packet propagates through the network, with each label generally being used by two LSRs to identify a particular segment of a multipoint LSP residing between the two LSRs. Accordingly, the LSR 300 includes an example packet label swapper 345 to process the label stack of a communication packet received via a multipoint LSP and to push, pop and swap labels to enable the communication packet to continue being routed along the multipoint LSP.

The LSR 300 also includes an example packet replicator 350 to enable the LSR 300 to support ingress replication. For example, the packet replicator 350 can replicate a received (ingress) communication packet from a root node (e.g., such as a PE router, ABR, ASBR, etc.) for transmission (egress) on multiple replicated communication paths for delivery to multiple leaf nodes (e.g., such as PE routers, ABRs, ASBRs, etc.).

The remaining figures and their associated descriptions further illustrate implementation and operation of the example LSR 300, the example message transceiver 305, the example downstream message processor 310, the example aggregation trigger 315, the example configuration processor 320, the example legacy protocol converter 325, the example upstream message processor 330, the example tunnel aggregator 335, the example packet transceiver 340, the example packet label swapper 345 and the example packet replicator 350.

While an example manner of implementing LSR 300 has been illustrated in FIG. 3, one or more of the elements, processes and/or devices illustrated in FIG. 3 may be combined, divided, re-arranged, omitted, eliminated and/or implemented in any other way. Further, the example message transceiver 305, the example downstream message processor 310, the example aggregation trigger 315, the example configuration processor 320, the example legacy protocol converter 325, the example upstream message processor 330, the example tunnel aggregator 335, the example packet transceiver 340, the example packet label swapper 345, the example packet replicator 350 and/or, more generally, the example LSR 300 of FIG. 3 may be implemented by hardware, software, firmware and/or any combination of hardware, software and/or firmware. Thus, for example, any of the example message transceiver 305, the example downstream message processor 310, the example aggregation trigger 315, the example configuration processor 320, the example legacy protocol converter 325, the example upstream message processor 330, the example tunnel aggregator 335, the example packet transceiver 340, the example packet label swapper 345, the example packet replicator 350 and/or, more generally, the example LSR 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example LSR 300, the example message transceiver 305, the example downstream message processor 310, the example aggregation trigger 315, the example configuration processor 320, the example legacy protocol converter 325, the example upstream message processor 330, the example tunnel aggregator 335, the example packet transceiver 340, the example packet label swapper 345 and/or the example packet replicator 350 are hereby expressly defined to include a computer readable medium such as a memory, digital versatile disk (DVD), compact disk (CD), etc., storing such software and/or firmware. Further still, the example LSR 300 of FIG. 3 may include one or more elements, processes and/or devices in addition to, or instead of, those illustrated in FIG. 3, and/or may include more than one of any or all of the illustrated elements, processes and devices.

Figure 4A:
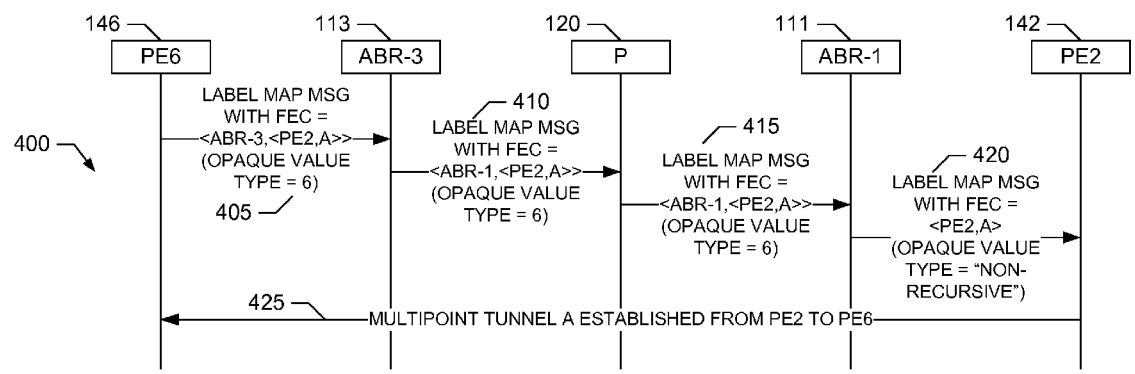
FIGS. 4A-B collectively illustrate example message sequence diagrams representing configuration of individual multipoint communication paths in the communication system of FIG. 1 using multicast label distribution protocol (mLDP) messaging.

FIG. 4A illustrates an example message sequence diagram 400 representing building of the individual multipoint communication path A (150) between PE2 (142) and PE6 (146) in the provider network 100 using mLDP messaging in the edge networks 131, 133 and in the core network 110. In the illustrated example, ABR-1 (111) and ABR-3 (113) are each implemented by a respective instance of the LSR 300 of FIG. 3. With reference to FIGS. 1 and 3, the message sequence diagram 400 begins with PE6 (146) sending an mLDP label mapping message 405 to ABR-3 (113), which is the interface between the core network 120 and the edge network 133 in which PE6 (146) resides. The mLDP label mapping message 405 includes a recursive FEC of <ABR-3, <PE2, A>> identifying the root (PE2) and tunnel ID (A) of the multipoint LSP that PE6 (146) wishes to join, as well as the intermediate root (ABR-3) that is the next-hop on the path to the root node (PE2). Additionally, the recursive FEC of the LDP label mapping message 405 includes an opaque value type set to the value "6," which in the illustrated example is used to indicate that the multipoint LSP A (150) being built to the leaf PE6 (146) is not to be aggregated. The mLDP label mapping message 405 also includes a downstream-assigned label (e.g., such as "LA1") assigned by PE6 (146) for identifying data packets conveyed via the multipoint LSP A (150) in the segment from ABR-3 (113) to PE6 (146).

In response to receiving the mLDP label mapping message 405, ABR-3 (113) determines that it is the identified intermediate root node, but that it does not have a complete route to the original root node (e.g., PE2). Accordingly, ABR-3 (113) changes the intermediate root node in the received recursive FEC to identify a new intermediate root node that is the next-hop on the path to the root node (PE2), which is ABR-1 (111) in the illustrated example. ABR-3 (113) sends an mLDP label mapping message 410 containing this updated recursive FEC of <ABR-1, <PE2, A>> to ABR-1 (111) through the core network 110 and, in particular, via the P router 120. The mLDP label mapping message 410 also includes a downstream-assigned label (e.g., such as "LA2") assigned by ABR-3 (113) for identifying data packets conveyed via the multipoint LSP A (150) in the segment from the P router 120 to ABR-3 (113). The P router 120, in turn, forwards a corresponding mLDP label mapping message 415 to ABR-1 (111) also having a recursive FEC of <ABR-1, <PE2, A>> and a downstream-assigned label (e.g., such as "LA3") assigned by the P router (120) for identifying data packets conveyed via the multipoint LSP A (150) in the segment from ABR-1 (111) to the P router (113).

In response to receiving the mLDP label mapping message 415, ABR-1 (111) determines that it is the identified intermediate root node, and that it does have a complete route to the original root node (e.g., PE2). Accordingly, ABR-1 (111) removes the intermediate root node identifier from the received FEC and sends an mLDP label mapping message 420 having a FEC of <PE2, A> to PE2 (142), which is the original root of the multipoint LSP that leaf PE6 (146) is building. The FEC of the mLDP label mapping message 420 includes an opaque value type indicating that the FEC is non-recursive. The mLDP label mapping message 420 also includes a downstream-assigned label (e.g., such as "LA4") assigned by ABR-1 (111) for identifying data packets conveyed via the multipoint LSP A (150) in the segment from PE2 (142) to ABR-1 (111). After receipt of the mLDP label mapping message 420, a complete set of down-stream assigned label mappings have been exchanged between the LSRs implementing the multipoint LSP A (150). As such, the multipoint LSP A (150) is built (which is represented in FIG. 4A as a directed line 425).

Figure 4B:
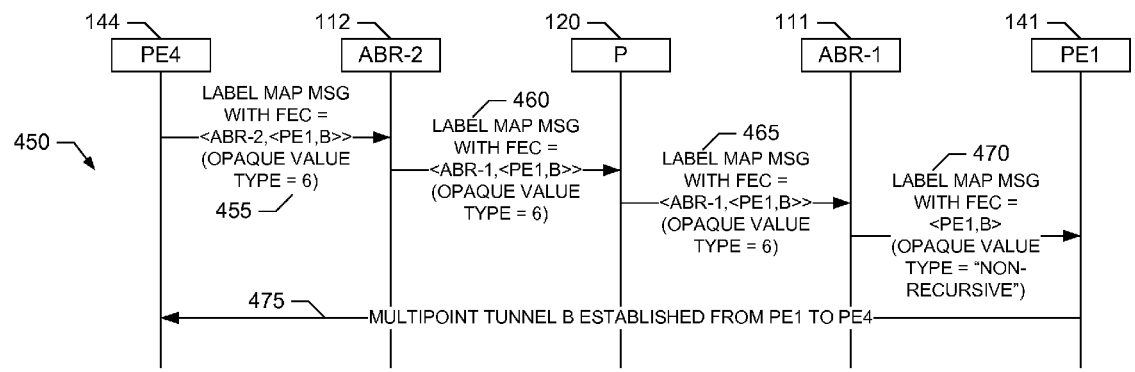

FIG. 4B illustrates an example message sequence diagram 450 representing building of the individual multipoint communication path B (160) between PE1 (141) and PE4 (141) in the provider network 100 using mLDP messaging in the edge networks 131, 132 and in the core network 110. In the message sequence diagram 450, the mLDP label mapping messages 455, 460, 465, and 470 are similar to the mLDP label mapping messages 405, 410, 415 and 420 of FIG. 4A, except for the FEC values and label mappings being changed to correspond to the multipoint LSP B (160) between PE1 (141) and PE4 (144), instead of the multipoint LSP A (150) between PE2 (142) and PE6 (146). Similar to the message sequence diagram 400, after receipt of the mLDP label mapping message 470 in the message sequence diagram 450, a complete set of down-stream assigned label mappings have been exchanged between the LSRs implementing the multipoint LSP B (160). As such, the multipoint LSP B (160) is built (which is represented in FIG. 4B as a directed line 475).

FIG. 5A illustrates an example message sequence diagram 500 representing building of the individual multipoint communication path A (150) between PE2 (142) and PE6 (146) in the provider network 100 using mLDP messaging in the edge networks 131, 133, but using RSVP-TE P2MP in the core network 110. As such, FIG. 5A illustrates using different multipoint label distribution protocols in the core network 110 than in the edge networks 131-133. In the illustrated example, ABR-1 (111) and ABR-3 (113) are each implemented by a respective instance of the LSR 300 of FIG. 3. With reference to FIGS. 1 and 3, the message sequence diagram 500 begins with PE6 (146) sending the mLDP label mapping message 405 described above to ABR-3 (113). However, unlike the message sequence diagram 400 of FIG. 4A, in the message sequence diagram 500, ABR-3 (113) is configured (e.g., via its configuration processor 320) to use RSVP-TE P2MP in the core network 110. Accordingly, in response to receiving the mLDP label mapping message 405, ABR-3 (113) sends an RSVP-TE P2MP Leaf Info message 510 via a targeted LDP session to ABR-1 (111), which is the next-hop towards the original root (PE2). The Leaf Info message identifies the multipoint LSP being built as <PE2, A>.

In response to receiving the Leaf Info message 510, ABR-1 (111) converts the Leaf Info message to the mLDP label mapping message 420 described above, which ABR-1 (111) sends to PE2 (142). Additionally, ABR-1 (111) continues using RSVP-TE P2MP to build the multipoint LSP A (150) in the core network 120 by sending an RSVP-TE PATH message 525 destined to ABR-3 (113) via the P router 120 requesting a downstream assigned label for the multipoint LSP A (150). When the P router 120 receives PATH message 525, the P router 120 propagates the received RSVP-TE PATH message as an RSVP-TE PATH message 530 to ABR-3 (113) that includes a request for a downstream assigned label for the multipoint LSP A (150). In response to receiving the PATH message 530, ABR-3 (113) sends the requested downstream-assigned label back to the P router 120 via an RSVP-TE RESV message 535. In response to receiving the RSVP-TE RESV message 535, the P router 120 sends its downstream-assigned label for LSP A (150) back to ABR-1 (111) via an RSVP-TE RESV message 540. After all downstream-assigned label mappings have been exchanged between the LSRs implementing the multipoint LSP A (150), the multipoint LSP A (150) is built (which is represented in FIG. 5A as a directed line 545).

FIG. 5B illustrates an example message sequence diagram 550 representing building of the individual multipoint communication path B (160) between PE1 (141) and PE4 (141) in the provider network 100 using mLDP messaging in the edge networks 131, 132, but using RSVP-TE P2MP in the core network 110. In the message sequence diagram 550, the RSVP-TE P2MP messages 560, 575, 580, 585 and 590 are similar to the RSVP-TE P2MP messages 510, 525, 530, 535 and 540, except for the message values and label mappings being changed to correspond to the multipoint LSP B (160) between PE1 (141) and PE4 (144), instead of the multipoint LSP A (150) between PE2 (142) and PE6 (146). Similar to the message sequence diagram 500, after all downstream-assigned label mappings have been exchanged between the LSRs implementing the multipoint LSP B (160) as shown in the message sequence diagram 550, the multipoint LSP B (160) is built (which is represented in FIG. 5B as a directed line 595).

Figure 6:
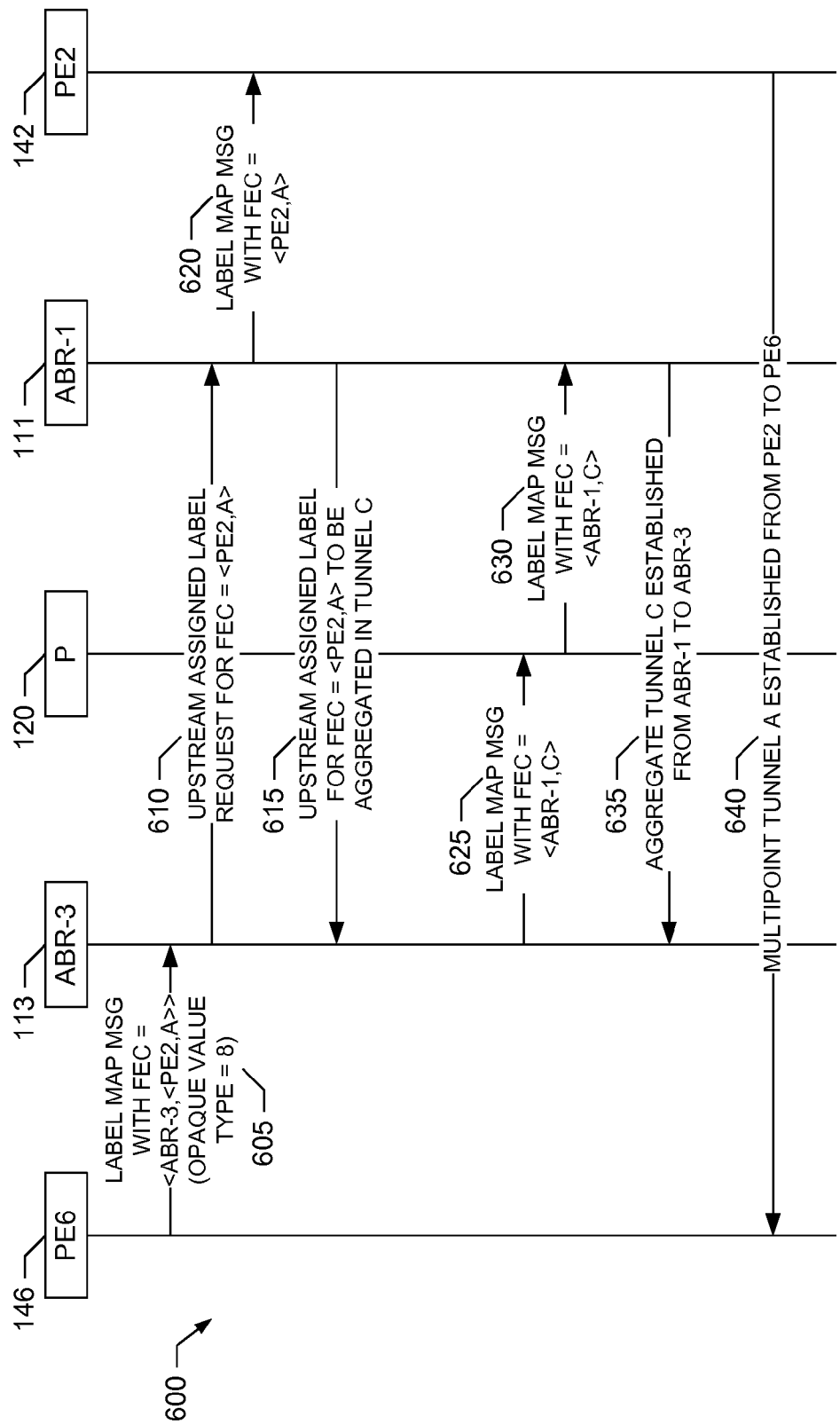
FIG. 6 illustrates an example message sequence diagram representing configuration of an aggregated multipoint communication path in the communication system of FIG. 2 using mLDP messaging.

FIG. 6 illustrates an example message sequence diagram 600 representing building and aggregation of the multipoint communication path A (150) between PE2 (142) and PE6 (146) in the provider network 200 using mLDP messaging in the edge networks 131, 133 and in the core network 110. Thus, in comparison with the message sequence diagram 400, the message sequence diagram 600 also illustrates aggregation of the inner multipoint communication path A (150) into the outer multipoint communication path C (210) in the core network 110. In the illustrated example, ABR-1 (111) and ABR-3 (113) are each implemented by a respective instance of the LSR 300 of FIG. 3. With reference to FIGS. 2 and 3, the message sequence diagram 600 begins with PE6 (146) sending an mLDP label mapping message 605 to ABR-3 (113), which is the interface between the core network 120 and the edge network 133 in which PE6 (146) resides. Like the mLDP label mapping message 405, the mLDP label mapping message 605 includes a recursive FEC of <ABR-3, <PE2, A>> identifying the root (PE2) and tunnel ID (A) of the multipoint LSP that PE6 (146) wishes to join, as well as the intermediate root (ABR-3) that is the next-hop on the path to the root node (PE2). However, unlike the mLDP label mapping message 405, the mLDP label mapping message 405 includes a recursive FEC with an opaque value type set to the value "8," which in the illustrated example is used to indicate that the multipoint LSP A (150) being built to the leaf PE6 (146) is to be aggregated. The mLDP label mapping message 605 also includes a downstream-assigned label (e.g., such as "LA1") assigned by PE6 (146) for identifying data packets conveyed via the multipoint LSP A (150) in the segment from ABR-3 (113) to PE6 (146).

In response to receiving the mLDP label mapping message 605, ABR-3 (113) decodes the opaque value type of "8," which is the trigger for performing aggregation of the inner multipoint LSP identified in the received mLDP label mapping message 605. Accordingly, ABR-3 (113) sends an upstream label assignment request message 610 via a targeted LDP session to the next-hop upstream LSR towards the original root (PE2) identified in the received recursive FEC. In the illustrated example, the next-hop upstream LSR is ABR-1 (111). In response to receiving an upstream label assignment request message, the receiving LSR continues forwarding the request upstream until the request reaches the ABR providing the interface between the core network 110 and the original root (e.g., PE2). In the illustrated example, ABR-1 (111) provides the interface between the core network 110 and PE2 (142), which is the original root of the inner multipoint LSP being built. Thus, upon receipt of the upstream label assignment request message 610 identifying PE2 (142) as the original root, ABR-1 (111) determines that it is the root of the outer multipoint tunnel C (210) for aggregating the inner multipoint LSP being built. As such, ABR-1 (111) determines an upstream-assigned label (e.g., such as "LUA") for the tunnel ID (e.g., A) identified in the received upstream label assignment request message 610 and returns the upstream-assigned label in an upstream label assignment message 615 sent to ABR-3 (113) via the established targeted LDP session. Additionally, in response to receiving the upstream label assignment request 610, ABR-1 (111) continues building the inner multipoint LSP A (150) towards PE2 (142) by sending an mLDP label mapping message 620 to PE2 (142) including a downstream-assigned label (e.g., such as "LA4") and a FEC of <PE2, A>, which corresponds to the inner multipoint LSP identification information included in the received upstream label assignment request 610.

If the outer multipoint LSP C (210) is already built between ABR-1 (111) and ABR-3 (113), then ABR-1 (111) and ABR-3 (113) associate the upstream-assigned label with the existing outer multipoint LSP. However, if the outer multipoint LSP C (210) is not already built, then ABR-3 (113) sends an mLDP label mapping message 625 containing a FEC of <ABR-1, C> towards ABR-1 (111) through the core network 110 and, in particular, via the P router 120. The FEC of <ABR-1, C> identifies ABR-1 (111) as the root of the outer multipoint LSP C (210), where the tunnel ID (e.g., C) for this outer multipoint LSP may be announced by ABR-1 (111), or may be set to the root ABR-1 (111) itself, as described above. The mLDP label mapping message 625 includes a downstream-assigned label (e.g., such as "LC1") assigned by ABR-3 (113) for identifying data packets conveyed via the outer multipoint LSP C (210) in the segment from the P router 120 to ABR-3 (113). The P router 120, in turn, forwards a corresponding mLDP label mapping message 630 to ABR-1

(111) also having a FEC of <ABR-1, C> and a downstream-assigned label (e.g., such as "LC2") assigned by the P router (120) for identifying data packets conveyed via the multipoint LSP C (210) in the segment from ABR-1 (111) to the P router (113).

After all downstream-assigned label mappings have been exchanged between the LSRs implementing the multipoint LSP C (210) between ABR-1 (111) and ABR-3 (113), the outer multipoint LSP C (160) is built (which is represented in FIG. 6 as a directed line 635). Additionally, after all downstream-assigned label mappings for the inner multipoint LSP A (150) between PE2 (142) and PE6 (146) have been exchanged in the external networks 131 and 133, and the upstream-assigned label mappings have been exchanged for aggregating the inner multipoint LSP A (150) in the outer multipoint LSP C (210), the inner multipoint LSP A (150) is built (which is represented in FIG. 6 as a directed line 640).

Figure 7:
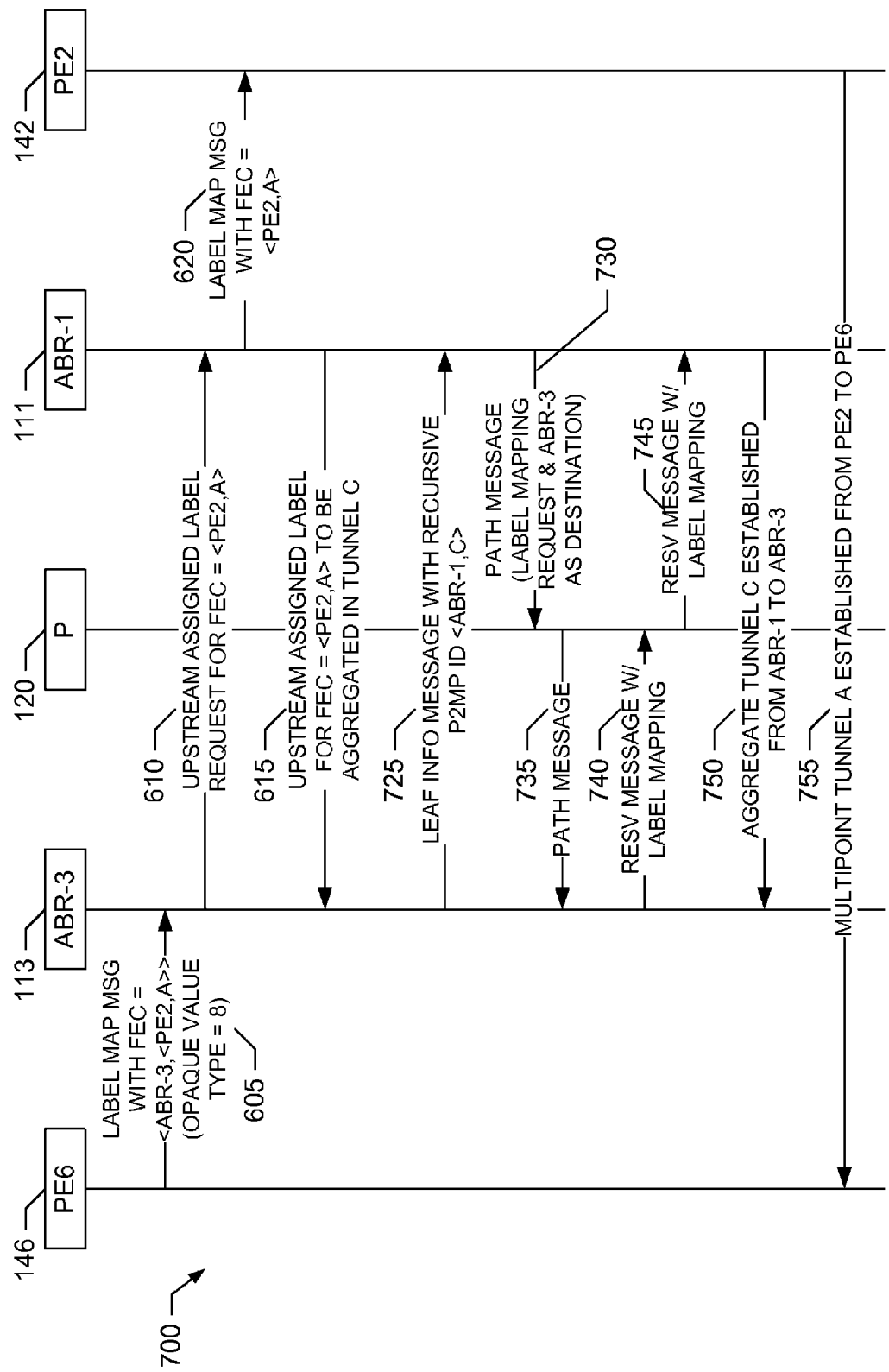
FIG. 7 illustrates an example message sequence diagram representing configuration of an aggregated multipoint communication path in the communication system of FIG. 2 using RSVP-TE P2MP messaging.

FIG. 7 illustrates an example message sequence diagram 700 representing building and aggregation of the individual multipoint communication path A (150) between PE2 (142) and PE6 (146) in the provider network 200 using mLDP messaging in the edge networks 131, 133, but using RSVP-TE P2MP in the core network 110. As such, FIG. 7 illustrates aggregation using different multipoint label distribution protocols in the core network 110 than in the edge networks 131-133. In the illustrated example, ABR-1 (111) and ABR-3 (113) are each implemented by a respective instance of the LSR 300 of FIG. 3. With reference to FIGS. 2 and 3, the message sequence diagram 700 begins with: (1) PE6 (146) sending the mLDP label mapping message 605 to ABR-3 (113); (2) ABR-3 (113) sending the upstream label assignment request message 610 to ABR1-1 (111); (3) ABR1-1 (111) returning the upstream label assignment message 615 to ABR-3 (113); and (4) ABR1-1 (111) sending the mLDP label mapping message 620 to PE2 (142), all of which are described above.

However, unlike the message sequence diagram 600 of FIG. 6, in the message sequence diagram 700, ABR-3 (113) is configured (e.g., via its configuration processor 320) to use RSVP-TE P2MP in the core network 110 to build the outer multipoint LSP C (210). Accordingly, in response to receiving the mLDP label mapping message 605, ABR-3 (113) sends an RSVP-TE P2MP Leaf Info message 725 via a targeted LDP session to ABR-1 (111). The Leaf Info message 725 identifies the multipoint LSP being built as <ABR-1, C> because ABR-1 (111) is the root of the outer multipoint LSP C (210), and the tunnel ID (e.g., C) for this outer multipoint LSP may be announced by ABR-1 (111), or may be set to the root ABR-1 (111) itself, as described above.

In response to receiving the Leaf Info message 725, ABR-1 (111) sends an RSVP-TE PATH message 730 towards ABR-3 (113) via the P router 120 to request a downstream assigned label for the multipoint LSP C (210). The P router 120 continues using RSVP-TE P2MP to build the multipoint LSP C (210) in the core network 120 by propagating the received RSVP-TE PATH message 730 as an RSVP-TE PATH message 735 to ABR-3 (113) to request a downstream assigned label for the multipoint LSP C (210). In response to receiving the PATH message 735, ABR-3 (113) sends the requested downstream-assigned label back to the P router 120 via an RSVP-TE RESV message 740. In response to receiving the RESV message 745, the P router 120 sends its downstream-assigned label for LSP C (210) back to ABR-1 (111) via an RSVP-TE RESV message 745.

After all downstream-assigned label mappings have been exchanged between the LSRs implementing the multipoint LSP C (210), the outer multipoint LSP C (210) is built (which is represented in FIG. 7 as a directed line 750). Additionally, after all downstream-assigned label mapping for the inner multipoint LSP A (150) between PE2 (142) and PE6 (146) have been exchanged in the external networks 131 and 133, and the upstream-assigned label mappings have been exchanged for aggregating the inner multipoint LSP A (150) in the outer multipoint LSP C (210), the inner multipoint LSP A (150) is built (which is represented in FIG. 7 as a directed line 755).

Figure 8:
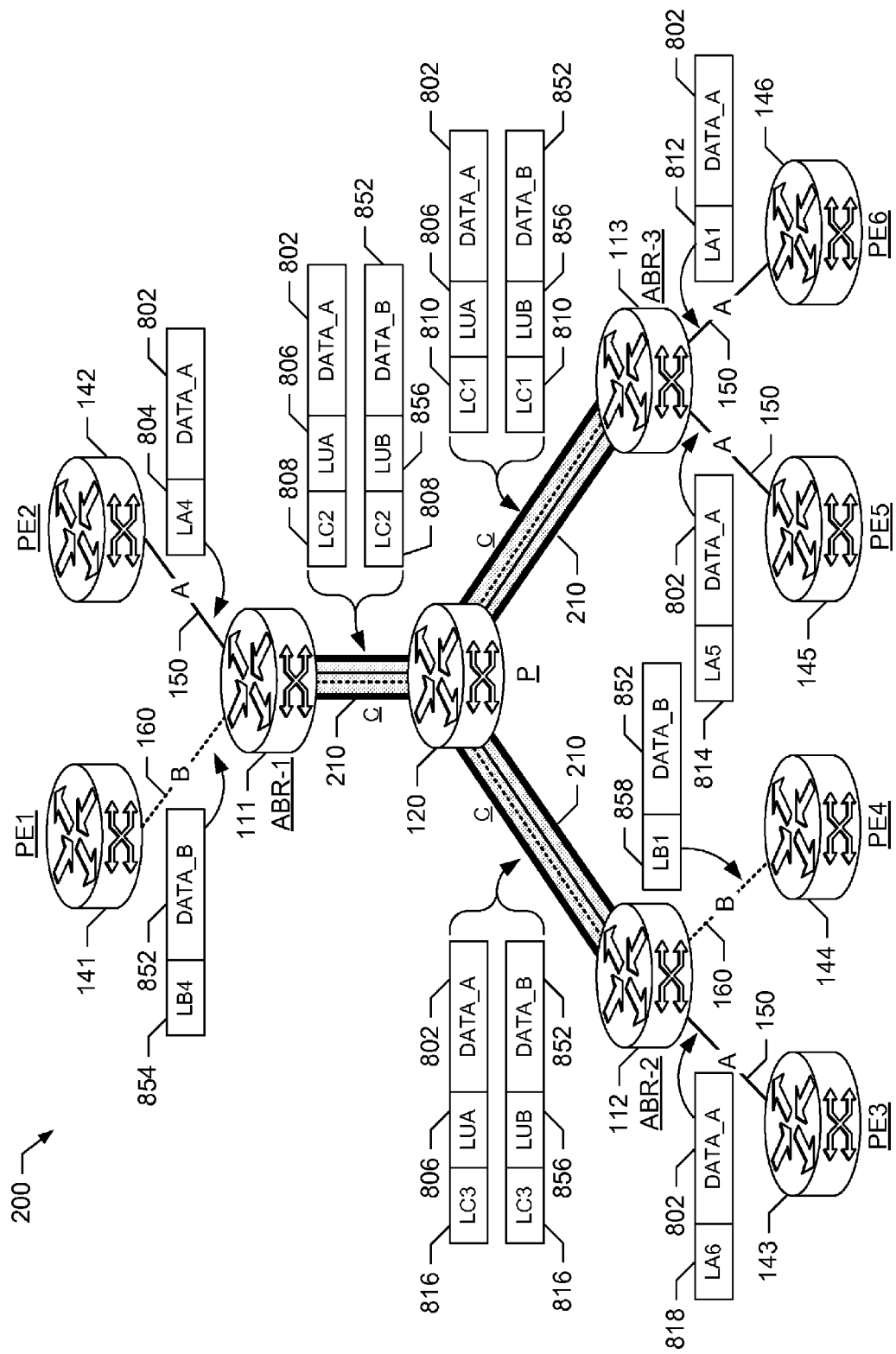
FIG. 8 illustrates example packet forwarding for aggregated multipoint communication paths in the communication system of FIG. 2.

FIG. 8 illustrates example packet forwarding over the aggregated multipoint LSPs of the provider network 200. Like elements in FIGS. 2 and 8 are labeled with the same reference numerals. In the illustrated example of FIG. 8, PE2 (142) is the root node of the inner multipoint LSP A (150) and is to send a data packet 802 having a downstream-assigned label 804 on its label stack. The downstream-assigned label 804 is assigned by ABR-1 (111) to identify packets for multipoint LSP A (150) conveyed in the segment between PE2 (142) and ABR-1 (111).

Because aggregation has been triggered, ABR-1 (111) swaps the downstream-assigned label 804 on the label stack for data packet 802 with the upstream-assigned label 806 assigned by ABR-1 (111) to identify packets for multipoint LSP A (150) when aggregated into the outer multipoint LSP C (210). ABR-1 (111) also pushes onto the packet's label stack a downstream-assigned label 808 assigned by the P router 120 to identify packets conveyed via the multipoint LSP C (210) in the segment between ABR-1 (111) and the P router 120. The P router 120 in turn receives the data packet 802 with the downstream-assigned label 808 identifying packets conveyed via the outer multipoint LSP C (210). (The upstream-assigned label 806 corresponding to the inner multipoint LSP A (150) is ignored in the core network and, thus, the core network does not need to maintain the individual states of the individual inner multipoint LSPs being aggregated.) The P router 120 swaps the downstream-assigned label 808 for a downstream-assigned label 810 assigned by ABR-3 (113) to identify packets conveyed via the multipoint LSP C (210) in the segment between the P router 120 and ABR-3 (113).

Next, ABR-3 (113) receives data packet 802 based on the downstream-assigned label 810 used to route packets conveyed via outer multipoint LSP C (210). ABR-3 (113) then processes the uplink-assigned label 806, which identifies the received data packet 802 as being conveyed via the inner multipoint LSP A (150), in the context of the outer label 810 of the LSP C (210) to determine whether the associated inner multipoint LSP A (150) has leaf PEs (e.g., such as PE5 and/or PE6) coupled to ABR-3 (113). If there are no such leaf nodes coupled to ABR-3 (113), ABR-3 (113) discards the packet 802. However, in the illustrated example, both PE5 (145) and PE6 (146) are leaves of the inner multipoint LSP (e.g., A) identified by the uplink-assigned label 806. Thus, ABR-3 (113) pops the downstream-assigned label 810 and upstream-assigned label 806 from the label stack and pushes a downstream-assigned label 812 assigned by PE6 (146) to route packets via the inner multipoint LSP A (150) to PE6 (146). Similarly, ABR-3 (113) pushes a downstream-assigned label 814 assigned by PE5 (145) to route packets via the inner multipoint LSP A (150) to PE5 (145).

When the P router 120 receives the data packet 802 with the downstream-assigned label 808 identifying packets conveyed via the outer multipoint LSP C (210) (the upstream-assigned label 806 is ignored), the P router 120 also swaps the downstream-assigned label 808 for a downstream-assigned label 816 assigned by ABR-2 (112) to convey the aggregated data packet via the multipoint LSP C (210) in the segment between the P router 120 and ABR-2 (112). Upon receipt of the data packet 802, ABR-2 (112) swaps the upstream-assigned label 806 with a downstream-assigned label 818 assigned by PE3 (143) for use in the context of the outer downstream-assigned label 816, and ABR-2 (112) then pops the outer label 816 from the label stack. ABR-2 (112) then forwards the data packet 802 to PE3 (143), but does not forward the data packet 802 to PE4 (144) because the data packet 802 did not contain an upstream-assigned label in its label stack for an inner multipoint LSP via which PE4 (144) is to receive multipoint traffic.

Similar packet forwarding processing is performed for the inner multipoint LSP B (160) rooted at PE1 (141). For example, PE2 (142) is to send a data packet 852 having a downstream-assigned label 854 on its label stack to identify the packet 852 as being conveyed via the multipoint LSP B (160) in the segment between PE1 (141) and ABR-1 (111). Because aggregation has been triggered, ABR-1 (111) swaps the downstream-assigned label 854 on the label stack for data packet 852 with the upstream-assigned label 856 assigned by ABR-1 (111) to the multipoint LSP B (160). ABR-1 (111) also pushes onto the packet's label stack the downstream-assigned label 808 assigned by the P router 120 to identify packets conveyed via the multipoint LSP C (210) in the segment between ABR-1 (111) and the P router 120. The P router 120 in turn receives the data packet 852 with the downstream-assigned label 808 identifying packets conveyed via the outer multipoint LSP C (210) (the upstream-assigned label 856 is ignored). The P router 120 swaps the downstream-assigned label 808 for a downstream-assigned label 810 assigned by ABR-3 (113) to identify packets conveyed via the multipoint LSP C (210) in the segment between the P router 120 and ABR-3 (113).

Next, ABR-3 (113) receives data packet 852 based on the downstream-assigned label 810 used to route packets conveyed via outer multipoint LSP C. ABR-3 (113) then processes the uplink-assigned label 856, which identifies the received data packet 852 as being conveyed via the inner multipoint LSP B (160) in the context of the outer label 808, to determine whether any PEs (e.g., such as PE5 and/or PE6) coupled to ABR-3 (113) are leaves of the inner multipoint LSP (e.g., B) identified by the uplink-assigned label 806. In the illustrated example, there are no such leaf nodes coupled to ABR-3 (113), so ABR-3 (113) discards the packet 852.

When the P router 120 receives the data packet 852 with the downstream-assigned label 808 identifying packets conveyed via the outer multipoint LSP C (210) (the upstream-assigned label 856 is ignored), the P router 120 also swaps the downstream-assigned label 808 for a downstream-assigned label 816 assigned by ABR-2 (112) to convey the aggregated data packet via the multipoint LSP C (210) in the segment between the P router 120 and ABR-2 (112). Upon receipt of the data packet 852, ABR-2 (112) swaps the upstream-assigned label 856 with a downstream-assigned label 858 assigned by PE4 (144) for use in the context of the outer label 816, and subsequently ABR-2 (112) pops the outer label 816 from the label. ABR-2 (112) then forwards the data packet 852 to PE4 (144), but does not forward the data packet 802 to PE3 (143) because the data packet 852 did not contain an upstream-assigned label in its label stack for an inner multipoint LSP via which PE3 (143) is to receive multipoint traffic.

The provider networks 100 and 200 can also be configured to support the use of legacy multicasting protocols in one or more of the edge sections 131, 132 and/or 133 of the provider network. For example, although the core network 110 may implement label switching protocols, such as multi-protocol label switching (MPLS), one or more of the PE routers and/or other LSRs in the edge networks 131-133 may be legacy routers implementing legacy multicasting protocols. One such legacy multicasting protocol is protocol independent multicast (PIM) source specific multicast (SSM), which is based on Internet protocol (IP) messaging and does not employ labels for routing/switching. To support such legacy PE routers (and other LSRs), a multicast PIM-SSM tree (also referred to as a PIM-SSM channel) rooted at a legacy PE is converted to a multipoint LSP at the ABR coupled to the legacy PE. This ABR acts as the root of the multipoint LSP.

Figure 9:
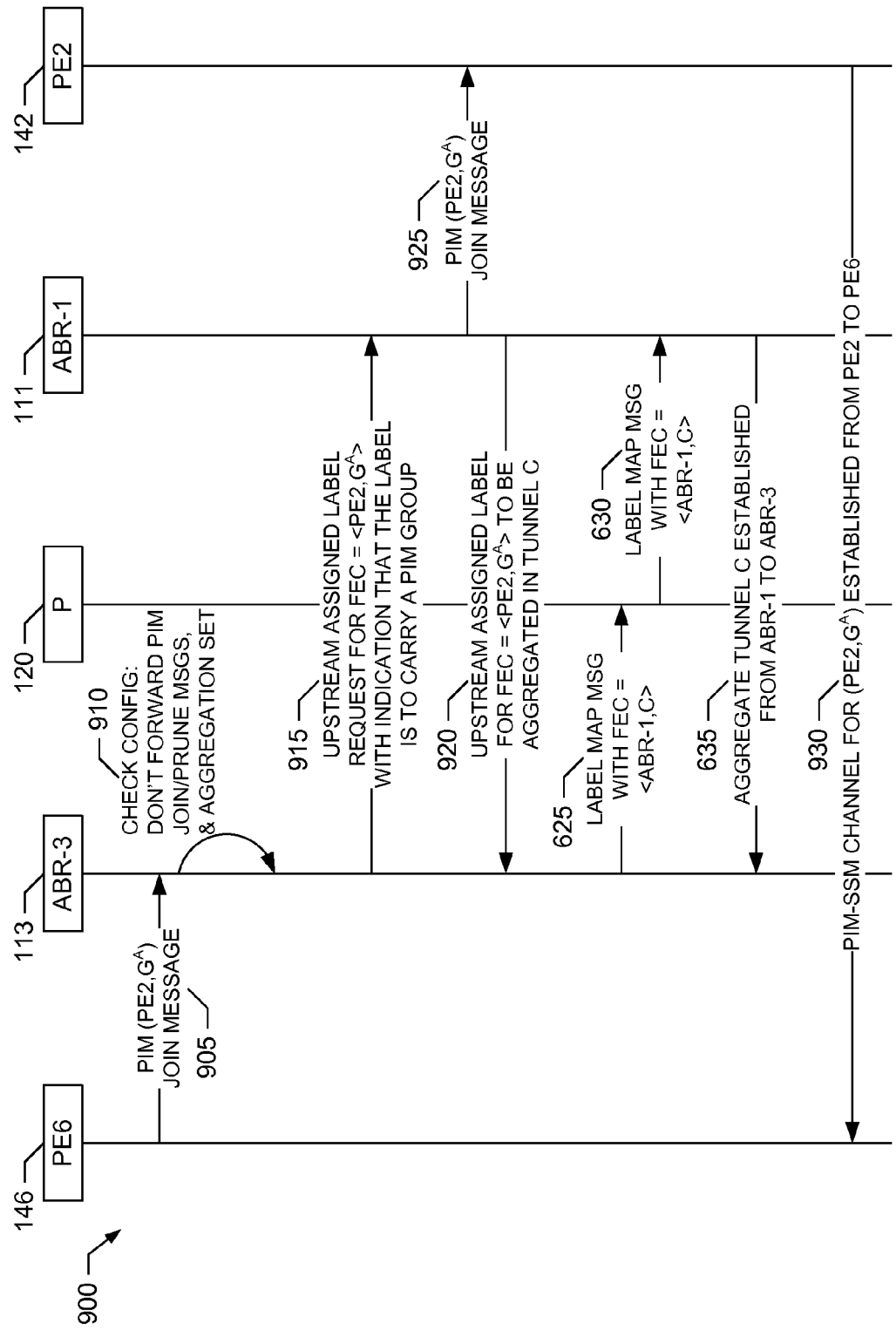
FIG. 9 illustrates an example message sequence diagram representing configuration of an aggregated multipoint communication path supporting a legacy multicast protocol in the communication system of FIG. 2.

A message sequence diagram 900 illustrating building and aggregation of a multicast PIM-SSM tree rooted at a legacy PE in the provider network 200 is provided in FIG. 9. In the illustrated example, PE2 (142) and PE6 (146) are legacy routers supporting PIM-SSM, and the multipoint communication path A (150) corresponds to a PIM-SSM tree A (150) rooted at PE2 (142) with a leaf at PE6 (146). In the illustrated example, ABR-1 (111) and ABR-3 (113) are each implemented by a respective instance of the LSR 300 of FIG. 3. With reference to FIGS. 2 and 3, the message sequence diagram 900 begins with PE6 (146) sending a PIM (PE2, $G^A$) Join message 905 to ABR-3 (113) that identifies PE2 (142) as the root of the PIM tree. The PIM (PE2, $G^A$) Join message 905 also identifies the multicast group Internet protocol (IP) address ($G^A$) rooted at PE2 (142) that PE6 (146) wishes to join.

In the illustrated example, ABR-3 (113) determines that it is configured (e.g., via its configuration processor 320) to: (1) not forward PIM join and prune messages (e.g., and to use a label switching protocol to implement the multicast tree in the core network 110), and (2) trigger aggregation when a PIM join message is received. This determination is illustrated as a directed line 910 in FIG. 9. Because aggregation is configured, ABR-3 (113) converts the multicast tree identification information included in the PIM (PE2, $G^A$) Join message 905 to a FEC of <PE2, $G^A$>, with PE2 identifying the root node and the group identifier $G^A$ being used as the FEC tunnel ID. ABR-3 (113) then sends an upstream label assignment request message 915, with the FEC of <PE2, $G^A$>, via a targeted LDP session to the next-hop upstream LSR towards the root (PE2) of the PIM tree. In the illustrated example, the next-hop upstream LSR is ABR-1 (111). The upstream label assignment request message 915 also includes a PIM indicator that is set to indicate that the inner multipoint LSP to be identified by the upstream-assigned label will be carrying traffic for a legacy PIM group.

Upon receipt of the upstream label assignment request message 915 identifying PE2 (142) as the root, ABR-1 (111) determines that it is the root of the outer multipoint tunnel C (210) for aggregating the inner multipoint LSP being built. As such, ABR-1 (111) determines an upstream-assigned label for the tunnel ID (e.g., $G^A$) identified in the received upstream label assignment request message 610 and returns the upstream-assigned label in an upstream label assignment message 615 sent to ABR-3 (113) via the established targeted LDP session. Additionally, ABR-1 (111) determines that the PIM indicator in the received upstream label assignment request message 915 is set. Thus, to continue building the PIM tree to PE2 (142), ABR-1 (111) sends another PIM (PE2, $G^A$) Join message 925 to PE2 (142) that includes PE2 (142) as the root node and $G^A$ as the multicast group IP address.

Next, if the outer multipoint LSP C (210) needs to be built, messages 625 and 630 as described above in connection with FIG. 6 are sent, with the result being the outer multipoint LSP C (210) being built between ABR-1 (111) and ABR-3 (113). With this, the PIM-SSM tree A (150) is built (which is represented by a directed line 930 in FIG. 9).

Figure 10:
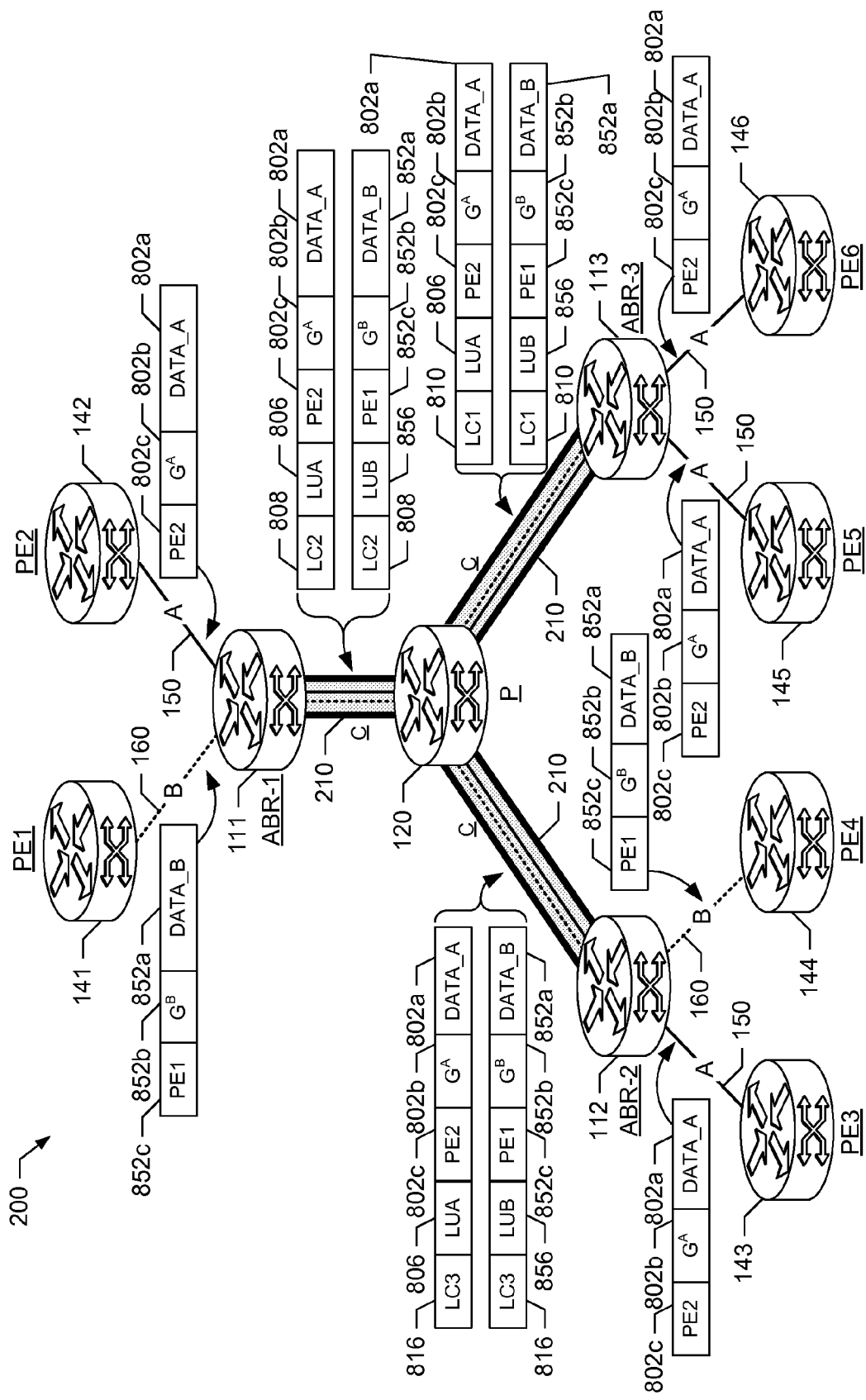
FIG. 10 illustrates example packet forwarding for aggregated multipoint communication paths supporting a legacy multicast protocol in the communication system of FIG. 2

FIG. 10 illustrates example packet forwarding for legacy PIM-SSM trees that are aggregated into an outer multipoint LSP in the provider network 200. The example of FIG. 10 is similar to the example of FIG. 8. Thus, like elements in FIGS. 2, 8 and 10 are labeled with the same reference numerals.

In the illustrated example of FIG. 10, PE2 (142) is the root node of the PIM-SSM tree A (150) and PE1 (141) is the root node of the PIM-SSM tree B (160), and both PIM-SSM trees are to be aggregated into the outer multipoint LSP C (210). Packet forwarding in the example of FIG. 10 is similar to packet forwarding in FIG. 8 with the following two differences. First, the downstream-assigned labels 804, 812, 814, 818, 854 and 858 employed for routing in the edge networks in FIG. 8 are omitted from FIG. 10 because, in FIG. 10, legacy PIM-SSM trees, instead of labels, are used to implement multicast trees in the edge networks. Second, the data fields 802 and 852 of FIG. 8 are replaced, respectively, by three data fields 802a, 802b and 802c, and 852a, 852b and 852c. The data fields 802a, 802b and 802c correspond to data traffic, group identifier and root node identifier for the PIM-SSM tree A (150). Similarly, data fields 852a, 852b and 852c correspond to data traffic, group identifier and root node identifier for the PIM-SSM tree B (160). Except for the foregoing differences, packet forwarding for legacy PIM-SSM trees as illustrated in FIG. 10 employs similar packet label pushing, popping and swapping as described above in connection with the packet forwarding operation of FIG. 8.

A message sequence diagram 1100 illustrating building of a multicast PIM-SSM tree A (150) rooted at legacy PE2 (142) without aggregation and using mLDP messaging in the core network 110 of the provider network 200 is provided in FIG. 11A. In the illustrated example, PE2 (142) and PE6 (146) are legacy routers supporting PIM-SSM, and the multipoint communication path A (150) corresponds to a PIM-SSM tree A (150) rooted at PE2 (142) with a leaf at PE6 (146). In the illustrated example, ABR-1 (111) and ABR-3 (113) are each implemented by a respective instance of the LSR 300 of FIG. 3. With reference to FIGS. 1 and 3, the message sequence diagram 900 begins with PE6 (146) sending the PIM Join message 905 described above. In the illustrated example, ABR-3 (113) determines that it is configured (e.g., via its configuration processor 320) to: (1) not forward PIM join and prune messages (e.g., and to use a label switching protocol to implement the multicast tree in the core network 110), and (2) not trigger aggregation when a PIM join message is received. This determination is illustrated as a directed line 1110 in FIG. 11A.

Because aggregation is not to be triggered, ABR-3 (113) sends an mLDP label mapping message 1115 to ABR-1 (111) via the P router 120 that includes a recursive FEC of <ABR-1, <PE2, $G^A$>>, with ABR-2 identifying the intermediate LSR towards the root PE2 and the group identifier $G^A$ being used as the tunnel ID. The mLDP label mapping message 1115 also includes a downstream-assigned label assigned by ABR-3 (113) for identifying data packets conveyed via the multipoint LSP A (150) in the segment from the P router 120 to ABR-3 (113). The mLDP label mapping message 1115 further includes an opaque value type set to a particular value (e.g., such as "10" or some other specified value) to indicate that the multipoint LSP being built will be carrying traffic for a legacy PIM group.

The P router 120, in turn, forwards a corresponding mLDP label mapping message 1120 to ABR-1 (111) also having a FEC of <ABR-1, <PE2, $G^A$>>, and a downstream-assigned label assigned by the P router (120) for identifying data packets conveyed in the segment from ABR-1 (111) to the P router (113). After receiving the mLDP label mapping message 1120, ABR-1 (111) determines that the opaque value type is set to "10," indicating that a PIM-SSM tree is being built. Thus, to continue building the PIM tree to PE2 (142), ABR-1 (111) sends the PIM (PE2, $G^A$) Join message 925 described above to PE2 (142). This result in the PIM-SSM tree A (150) being built, which is represented by a directed line 1130 in FIG. 11A.

FIG. 11B illustrates an example message sequence diagram 1150 representing building of a PIM-SSM tree B (160) between legacy PE1 (141) and legacy PE4 (144) in the provider network 100 without aggregation and using mLDP messaging in the core network 110. In the message sequence diagram 1150, the messages 1155, 1165, 1170 and 1175, and processing 1160, are similar to the respective messages 905, 1115, 110, and 925, and processing at block 1110 of FIG. 11A, except for the FEC values and label mappings being changed to correspond to the PIM-SSM tree B (160) between PE1 (141) and PE4 (144), instead of the PIM-SSM tree A (150) between PE2 (142) and PE6 (146). Similar to the message sequence diagram 1100, the result of the message sequence diagram 1150 is the PIM-SSM tree B (160) being built, which is represented by a directed line 1180 in FIG. 11B.

FIG. 12A illustrates an example message sequence diagram 1200 representing building of a PIM-SSM tree A (150) between legacy PE2 (142) and legacy PE6 (146) in the provider network 100 without aggregation and using RSVP-TE P2MP messaging in the core network 110. In the illustrated example, ABR-1 (111) and ABR-3 (113) are each implemented by a respective instance of the LSR 300 of FIG. 3. With reference to FIGS. 1 and 3, the message sequence diagram 1200 begins with PE6 (146) sending the PIM Join message 905 described above and ABR-3 (113) performing the processing associated with directed line 1110 described above to determine that (1) PIM join and prune messages are not to be forwarded and (2) aggregation is not to be triggered when a PIM join message is received.

Because aggregation is not to be triggered, ABR-3 (113) sends an RSVP-TE P2MP Leaf Info message 1215 via a targeted LDP session to ABR-1 (111) that includes a recursive P2MP ID of <PE2, $G^A$>, with PE2 identifying the original root node and the multicast group IP address $G^A$ being used as the tunnel ID. The RSVP-TE P2MP Leaf Info message 1215 also includes a PIM indicator that is set. After receiving the RSVP-TE P2MP Leaf Info message 1215, ABR-1 (111) determines that the PIM indicator is set, indicating that a PIM-SSM tree is being built. Thus, to continue building the PIM tree to PE2 (142), ABR-1 (111) sends the PIM (PE2, $G^A$) Join message 925 described above to PE2 (142). Additionally, RSVP-TE Path and Resv message pairs 1220-1225 and 1230-1235 are exchanged to implement the multipoint LSP that is to carry the PIM-SSM tree A (150) in the core network 110. The result is the PIM-SSM tree A (150) being built, which is represented by a directed line 1240 in FIG. 12A.

FIG. 12B illustrates an example message sequence diagram 1250 representing building of a PIM-SSM tree B (160) between legacy PE1 (141) and legacy PE4 (144) in the provider network 100 without aggregation and using RSVP-TE P2MP messaging in the core network 110. In the message sequence diagram 1250, the messages 1255, 1265, 1270, 1275, 1280, 1285 and 1290, and processing 1260, are similar to the respective messages 905, 1215, 925, 1220 1225, 1230 and 1235, and processing at block 1110 of FIG. 12A, except for the FEC values and label mappings being changed to correspond to the PIM-SSM tree B (160) between PE1 (141) and PE4 (144), instead of the PIM-SSM tree A (150) between PE2 (142) and PE6 (146). Similar to the message sequence diagram 1200, the result of the message sequence diagram 1250 is the PIM-SSM tree B (160) being built, which is represented by a directed line 1180 in FIG. 11B.

Figure 13:
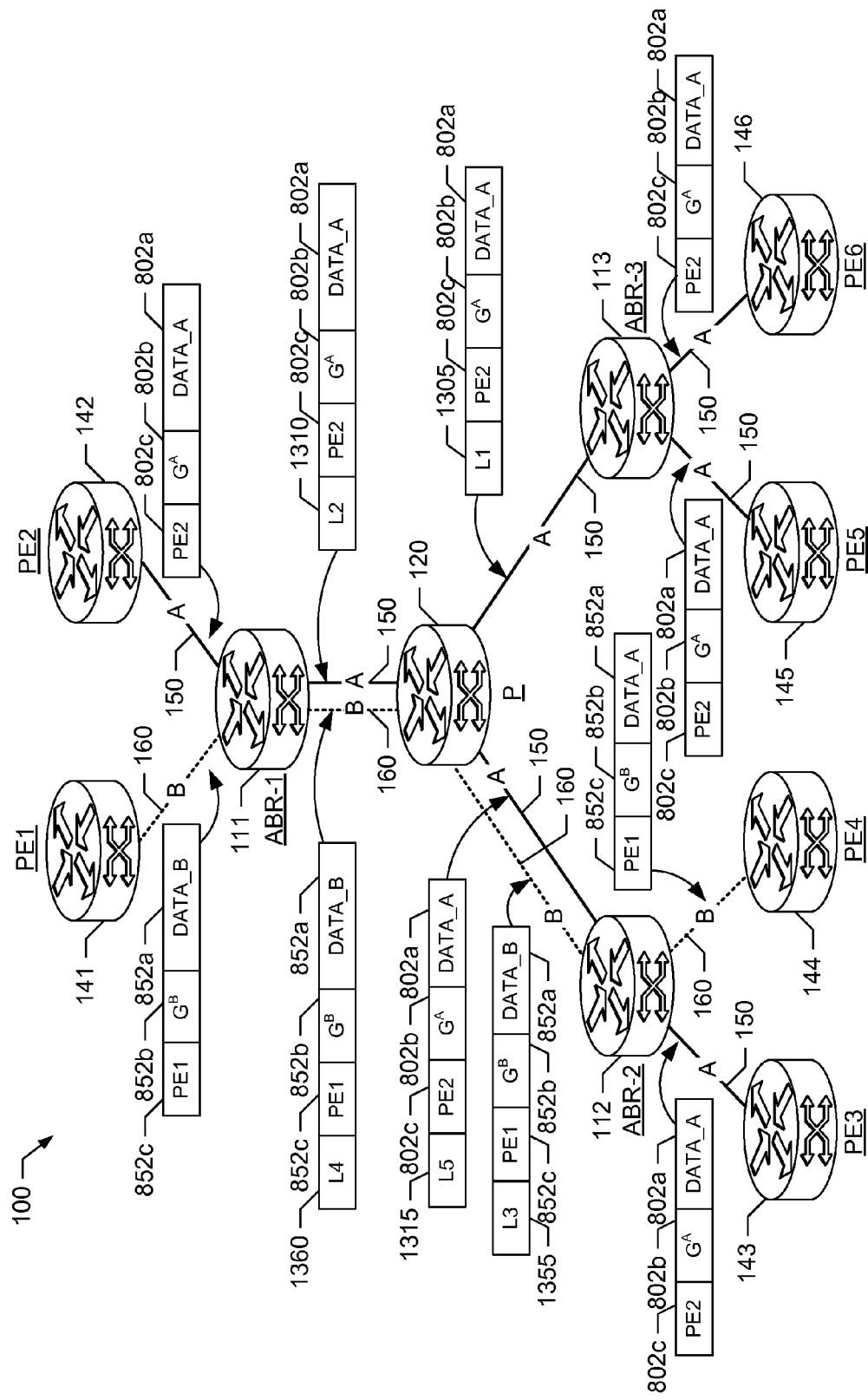
FIG. 13 illustrates example packet forwarding for individual multipoint communication paths supporting a legacy multicast protocol in the communication system of FIG. 1.

FIG. 13 illustrates example packet forwarding for legacy PIM-SSM trees that are not aggregated in the provider network 100. The example of FIG. 13 is similar to the example of FIG. 10, except in FIG. 13 aggregation is not being performed. Thus, like elements in FIGS. 1, 10 and 13 are labeled with the same reference numerals.

In the illustrated example of FIG. 13, PE2 (142) is the root node of the PIM-SSM tree A (150) and PE1 (141) is the root node of the PIM-SSM tree B (160). Both PIM-SSM trees are individually routed through the core network. Similar to the example of FIG. 10, the data fields 802a, 802b and 802c being conveyed via the PIM-SSM tree A (150) are treated as a single data element in the core network, and the data fields 852a, 852b and 852c being conveyed via the PIM-SSM tree B (160) are also treated as a single data element in the core network. However, instead of aggregating the PIM-SSM trees in the core network, the PIM-SSM tree A (150) is routed individually through the core network using downstream-assigned labels 1305-1315, as shown in FIG. 13. Similarly, instead of aggregating the PIM-SSM B (160) in the core network, the PIM-SSM tree B (160) is routed individually through the core network using downstream-assigned labels 1355-1360, as shown in FIG. 13.

Figure 14:
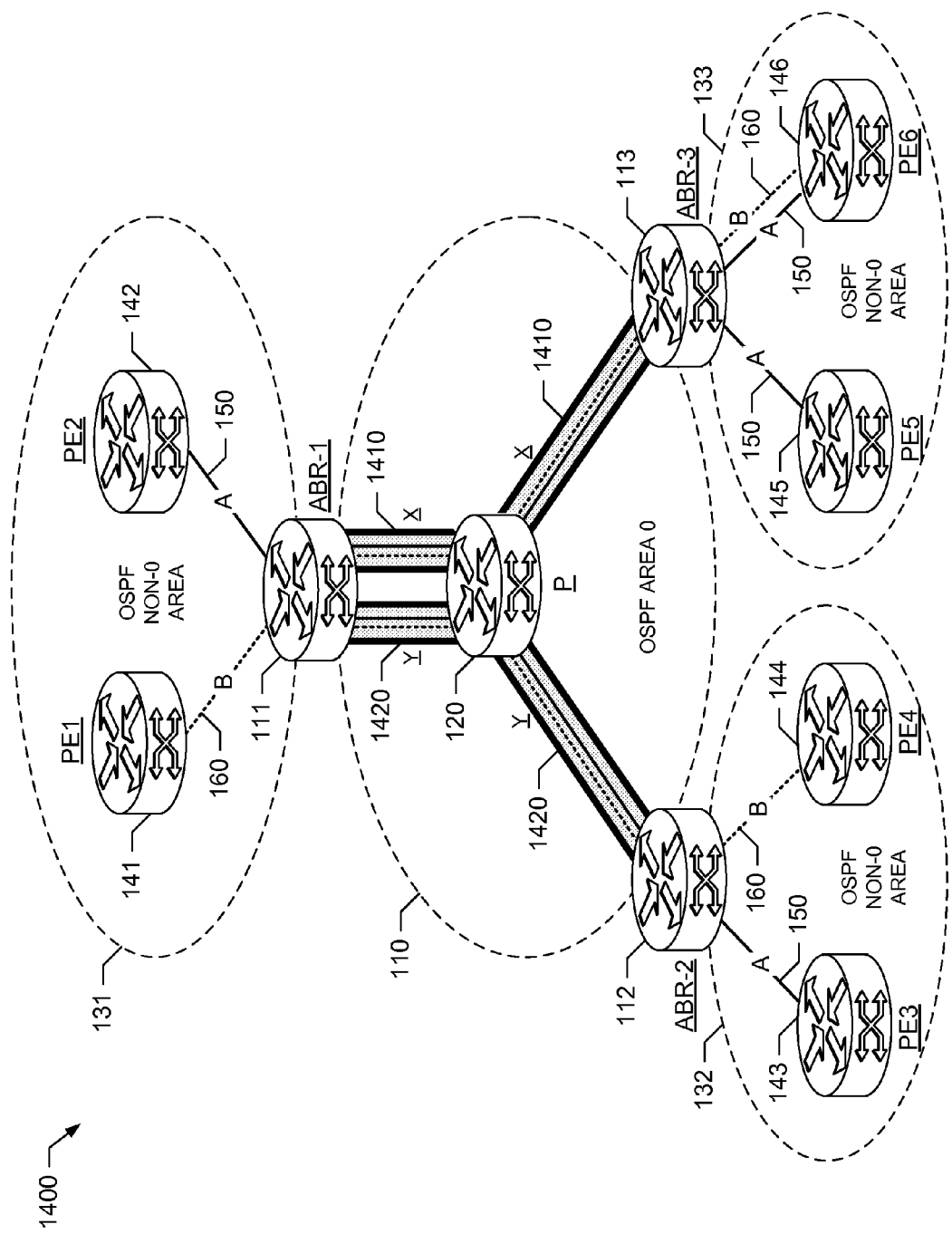
FIG. 14 is a block diagram of the communication system of FIG. 1 when configured to perform ingress replication of communication paths as described herein.

As noted above, the example methods, apparatus and articles of manufacture disclosed herein also enable traffic sent from a root LSR (e.g., such as a root PE router) to be ingress replicated (possibly recursively) for sending to multiple leaf LSRs (e.g., such as multiple leaf PEs). Furthermore, the ingress replication can occur in the edge and/or core segments of a provider network without requiring those segments to be multicast enabled. FIG. 14 illustrates an example provider network 1400 that corresponds to the provider network 100 when configured to support such ingress replication. Like elements in FIGS. 1 and 2 are labeled with the same reference numerals.

Ingress replication involves replicating a packet over multiple unicast (also referred to as unipoint) links or unicast tunnels (e.g., such as multiple unicast LSPs) to a set of previously discovered leaf LSRs. (As used herein, the terms "unicast" and "unipoint" are interchangeable unless indicated otherwise.) In the provider network 1400, ingress replication is triggered at an upstream ABR (e.g., or, more generally, an intermediate LSR in the provider network 1400), when the upstream ABR receives from a downstream LSR (e.g., such as a downstream ABR or downstream PE router) an mLDP label mapping including a recursive FEC having the form of <U-ABR, <root PE, tunnel-ID>> and a new opaque value type having a particular value (e.g., such as a value set to "9" or some other specified value). This particular value of the opaque value type indicates that traffic from the <root PE, tunnel-ID> identified in the received FEC is to be ingress replicated by the upstream ABR identified in the received FEC as U-ABR. In some examples, the mLDP label mapping message is received over a targeted mLDP session.

For example, when an upstream ABR (e.g., such as ABR-1) in the provider network 1400 receives from a downstream ABR (e.g., such as ABR-3) an mLDP label mapping message with a FEC of <U-ABR, <root PE, tunnel-ID>> and an opaque value type set to "9," the upstream ABR (e.g., ABR-1) initiates ingress replication for traffic from the identified root PE (e.g., such as PE2) associated with the identified tunnel-ID (e.g., such as A) that is destined to the downstream ABR (e.g., such as ABR-3). The upstream ABR (e.g., such as ABR-1) implements ingress replication of the identified traffic by using a two-label stack in which the inner label is an downstream-assigned mLDP label assigned to identify the particular replicated traffic stream (e.g., such as A), and the outer label is a downstream-assigned unicast label used to identify a particular segment of the unicast tunnel (e.g., such as X) carrying the replicated traffic identified by the downstream-assigned mLDP label.

In the provider network 1400, ABR-1 (111) implements two unicast tunnels X (1410) and Y (1420) to replicate ingress traffic associated with the multipoint LSP A (150) and the multipoint LSP B (160). Through ingress replication, the unicast tunnels X (1410) and Y (1420) can aggregate the multipoint LSP A (150) and the multipoint LSP B (160) and convey multipoint communications through the core network 110 without requiring the core network 110 to itself support multipoint communications.

Figure 15:
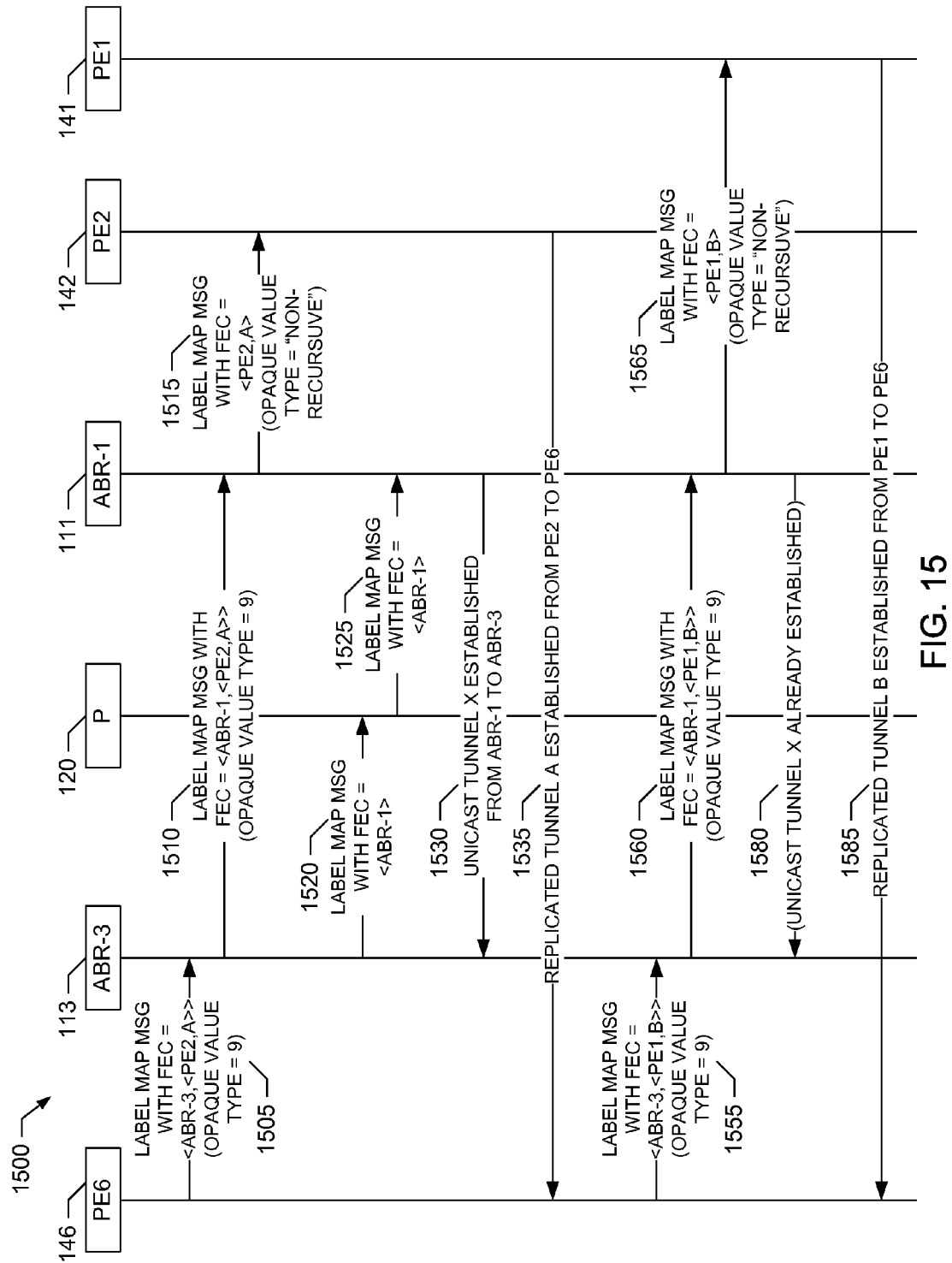
FIG. 15 illustrates an example message sequence diagram representing configuration of ingress communication path replication in the communication system of FIG. 14.

FIG. 15 illustrates an example message sequence diagram 1500 representing configuration of the provider network 1400 to support ingress replication of the multipoint communication path A (150) between PE2 (142) and PE6 (146). The message sequence diagram 1500 also represents configuration of the provider network 1400 to support ingress replication of the multipoint communication path B (160) between PE1 (141) and PE6 (146). In the illustrated example, ABR-1 (111) and ABR-3 (113) are each implemented by a respective instance of the LSR 300 of FIG. 3. With reference to FIGS. 3 and 14, the message sequence diagram 1500 begins with PE6 (146) sending an mLDP label mapping message 1505 to ABR-3 (113) that includes a recursive FEC of <ABR-3, <PE2, A>> identifying the root (PE2) and tunnel ID (A) of the multipoint LSP that PE6 (146) wishes to join, as well as the intermediate root (ABR-3) that is the next-hop on the path to the root node (PE2). The mLDP label mapping message 1505 also includes an opaque value type set to the value "9," which in the illustrated example is used to indicate that the multipoint LSP A (150) being built to the leaf PE6 (146) is to be ingress replicated through the core network 110. The mLDP label mapping message 1505 further includes a downstream-assigned mLDP label (e.g., such as "LA1") assigned by PE6 (146) for identifying data packets conveyed via the multipoint LSP A (150) in the segment from ABR-3 (113) to PE6 (146).

In response to receiving the mLDP label mapping message 1505, ABR-3 (113) sends an mLDP label mapping message 1510 via a targeted mLDP session to ABR-1 (111), which is the next-hop upstream LSR towards the original root (PE2) identified in the received recursive FEC. The mLDP label mapping message 1510 also includes a downstream-assigned mLDP label (e.g., such as "LA2") assigned by ABR-3 (113) for identifying data packets associated with the multipoint LSP A (150) and to be carried via ingress replication in a unicast tunnel from ABR-1 (111) to ABR-3 (113). The mLDP label mapping message 1510 further includes an opaque value type set to the value "9" to indicate that ABR-1 (111) is to perform ingress replication of the traffic from root PE2 (142) associated with tunnel-ID A (150), as identified in the recursive FEC included in the mLDP label mapping message 1510. In response to receiving the mLDP label mapping message 1510, ABR-1 (111) continues building the multipoint LSP A (150) towards PE2 (142) by sending an mLDP label mapping message 1515 to PE2 (142) including a downstream-assigned label (e.g., such as "LA3") and a FEC of <PE2, A>.

If the unicast tunnel X (1410) is already built between ABR-1 (111) and ABR-3 (113), then ABR-1 (111) and ABR-3 (113) associate the downstream-assigned mLDP label provided in the mLDP label mapping message 1510 with the existing unicast tunnel X (1410). However, if the unicast tunnel X (1410) is not already built, then ABR-3 (113) sends an LDP label mapping message 1520 with a FEC (or IP address) of ABR-1 (111) through the core network 110 and, in particular, via the P router 120. The mLDP label mapping message 1520 includes a downstream-assigned unicast label (e.g., such as "LX1") assigned by ABR-3 (113) for identifying data packets conveyed via the unicast tunnel X (1410) in the segment from the P router 120 to ABR-3 (113). The P router 120, in turn, sends an LDP label mapping message 1525 with a FEC (or IP address) of ABR-1 to ABR-1 (111) containing a downstream-assigned unicast label (e.g., such as "LX2") assigned by the P router (120) for identifying data packets conveyed via the unicast tunnel X (1410) in the segment from ABR-1 (111) to the P router (113). After the downstream-assigned unicast labels are exchanged, the unicast tunnel X (1410) is built (which is represented in FIG. 15 as a directed line 1530). The built unicast tunnel X (1410) is also ready to carry the ingress replicated traffic for the multipoint LSP A (150) (which is represented in FIG. 15 as a directed line 1535).

In the message sequence diagram 1500, PE6 (146) later sends another mLDP label mapping message 1555 to ABR-3 (113) that includes a recursive FEC of <ABR-3, <PE1, B>> identifying the root (PE1) and tunnel ID (B) of another multipoint LSP that PE6 (146) wishes to join, as well as the intermediate root (ABR-3) that is the next-hop on the path to the root node (PE1). The mLDP label mapping message 1555 also includes an opaque value type set to the value "9" to indicate that the multipoint LSP B (160) being built to the leaf PE6 (146) is to be ingress replicated through the core network 110. The mLDP label mapping message 1555 further includes a downstream-assigned mLDP label (e.g., such as "LB1") assigned by PE6 (146) for identifying data packets conveyed via the multipoint LSP B (160) in the segment from ABR-3 (113) to PE6 (146).

In response to receiving the mLDP label mapping message 1555, ABR-3 (113) sends an mLDP label mapping message 1560 via a targeted mLDP session to ABR-1 (111), which is the next-hop upstream LSR towards the original root (PE1) identified in the received recursive FEC. The mLDP label mapping message 1560 also includes a downstream-assigned mLDP label (e.g., such as "LB2") assigned by ABR-3 (113) for identifying data packets associated with the multipoint LSP B (160) and to be carried via ingress replication in a unicast tunnel from ABR-1 (111) to ABR-3 (113). The mLDP label mapping message 1610 further includes an opaque value type set to the value "9" to indicate that ABR-1 (111) is to perform ingress replication of the traffic from root PE1 (141) associated with tunnel-ID B (160), as identified in the recursive FEC included in the mLDP label mapping message 1560. In response to receiving the mLDP label mapping message 1516, ABR-1 (111) continues building the multipoint LSP B (160) towards PE1 (141) by sending an mLDP label mapping message 1565 to PE1 (141) including a downstream-assigned label (e.g., such as "LB3") and a FEC of <PE1, B>.

In the illustrated example, the unicast tunnel X (1410) is already built between ABR-1 (111) and ABR-3 (113) (which is represented in FIG. 15 by a directed line 1580). Thus, ABR-1 (111) and ABR-3 (113) associate the downstream-assigned mLDP label provided in the mLDP label mapping message 1560 with the existing unicast tunnel X (1410). The unicast tunnel X (1410) is then ready to carry the ingress replicated traffic for the multipoint LSP B (160) (which is represented in FIG. 15 as a directed line 1585).

Figure 16:
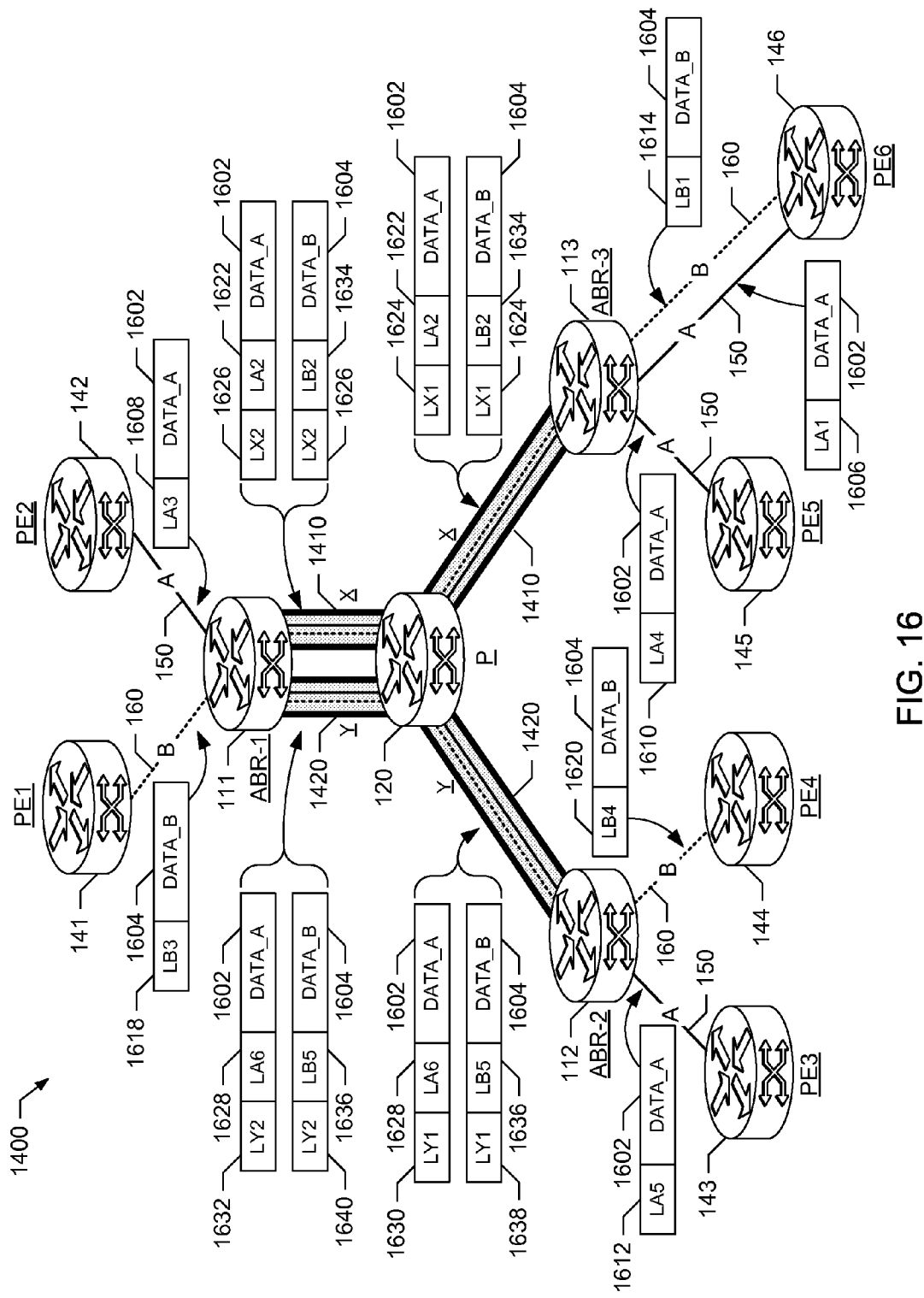
FIG. 16 illustrates example packet forwarding for ingress replicated communication paths in the communication system of FIG. 14.

FIG. 16 illustrates example packet forwarding using ingress replication in the provider network 1400. In the illustrated example of FIG. 16, PE2 (142) is the root node of the multipoint LSP A (150), whose traffic 1602 is to be routed to leaf PE routers including PE3 (143), PE5 (145) and PE6 (146). Additionally, PE1 (141) is the root node of the multipoint LSP B (160), whose traffic 1604 is to be routed to leaf PE routers including PE4 (144). Downstream-assigned labels 1606, 1608, 1610 and 1612 are used to route the traffic 1602 for multipoint LSP A (150) in the edge segments of the provider network 1400. Similarly, downstream-assigned labels 1614, 1618 and 1620 are used to route the traffic 1604 for multipoint LSP B (160) in the edge segments of the provider network 1400.

When the upstream ABR-1 (111) receives a packet from PE2 (142) for the multipoint LSP A (150), ABR-1 (111) replicates the traffic and swaps the mLDP label 1608 that it assigned for multipoint LSP A (150) with an mLDP label 1622 assigned by the downstream ABR-3 (113). ABR-1 (111) then uses unicast labels 1624 and 1626 to route the traffic 1602 for multipoint LSP A (150) through the core network via the unicast tunnel X (1410). ABR-1 (111) repeats this procedure for each leaf LSR from which it received an mLDP label mapping for the multipoint LSP A (150) with an opaque value type set to "9." For example, ABR-1 (111) repeats this procedure for ABR-2 (112) and uses the mLDP label 1628 and the unicast labels 1630 and 1632 to route the traffic 1602 for multipoint LSP A (150) through the core network to ABR-2 (112) via the unicast tunnel Y (1420).

Similarly, when the upstream ABR-1 (111) receives a packet from PE1 (141) for the multipoint LSP B (160), ABR-1 (111) replicates the traffic and swaps the mLDP label 1618 that it assigned for multipoint LSP B (160) with an mLDP label 1634 assigned by the downstream ABR-3 (113). ABR-1 (111) then uses the unicast labels 1624 and 1626 described above to route the traffic 1604 for multipoint LSP B (160) through the core network via the unicast tunnel X (1410). ABR-1 (111) repeats this procedure for each leaf LSR from which it received an mLDP label mapping for the multipoint LSP B (160) with an opaque value type set to "9." For example, ABR-1 (111) repeats this procedure for ABR-2 (112) and uses the mLDP label 1636 and the unicast labels 1638 and 1640 to route the traffic 1604 for multipoint LSP B (160) through the core network to ABR-2 (112) via the unicast tunnel Y (1420).

Flowcharts representative of example machine readable instructions that may be executed to implement the example ABRs 111, 112 and/or 113, the example LSR 300, the example message transceiver 305, the example downstream message processor 310, the example aggregation trigger 315, the example configuration processor 320, the example legacy protocol converter 325, the example upstream message processor 330, the example tunnel aggregator 335, the example packet transceiver 340, the example packet label swapper 345 and/or the example packet replicator 350 are shown in FIGS. 17A-C, 18 and 19A-B. In these examples, the machine readable instructions represented by each flowchart may comprise one or more programs for execution by a processor, such as the processor 2812 shown in the example processing system 2800 discussed below in connection with FIG. 20. Alternatively, the entire program or programs and/or portions thereof implementing one or more of the processes represented by the flowcharts of FIGS. 17A-C, 18 and 19A-B could be executed by a device other than the processor 2812 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 17A-C, 18 and 19A-B may be implemented manually. Further, although the example machine readable instructions are described with reference to the flowcharts illustrated in FIGS. 17A-C, 18 and 19A-B, many other techniques for implementing the example methods and apparatus described herein may alternatively be used. For example, with reference to the flowcharts illustrated in FIGS. 17A-C, 19 and 19A-B, the order of execution of the blocks may be changed, and/or some of the blocks described may be changed, eliminated, combined and/or subdivided into multiple blocks.

As mentioned above, the example processes of FIGS. 17A-C, 18 and 19A-B may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 17A-C, 18 and 19A-B may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 17A:
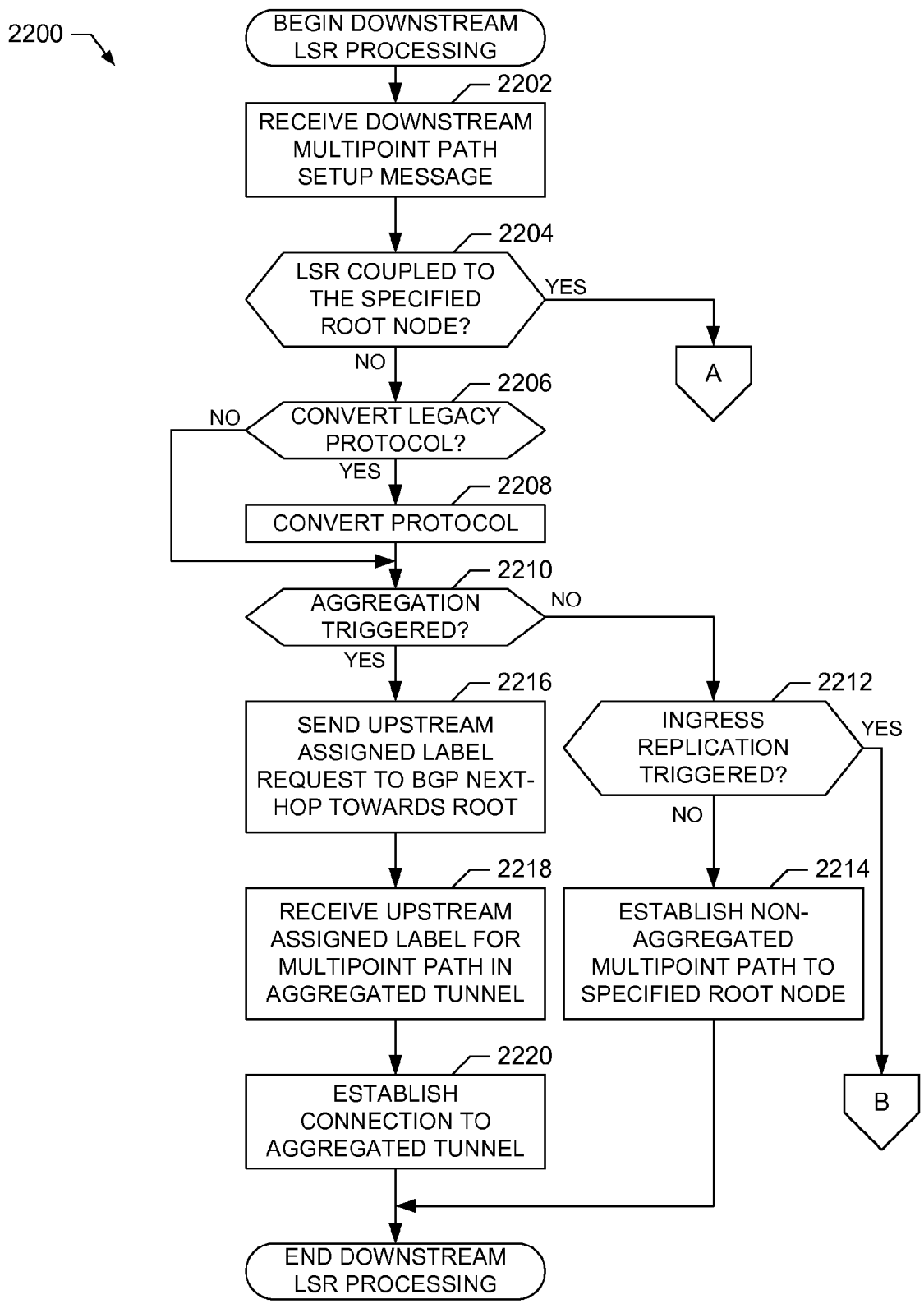
FIGS. 17A-C collectively are a flowchart representative of example machine readable instructions that may be executed to implement downstream ABR processing in the LSR of FIG. 3.
Figure 17C:
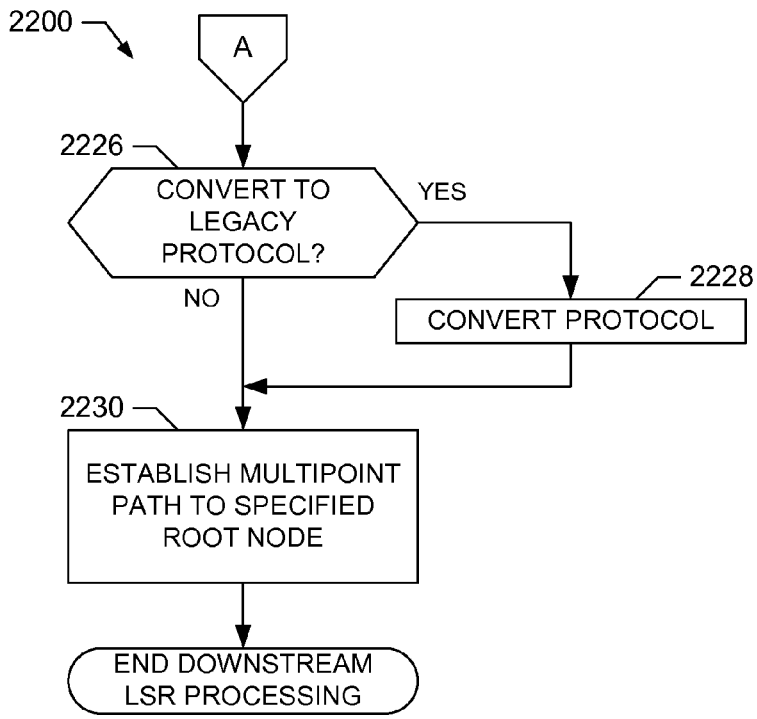
Figure 17B:
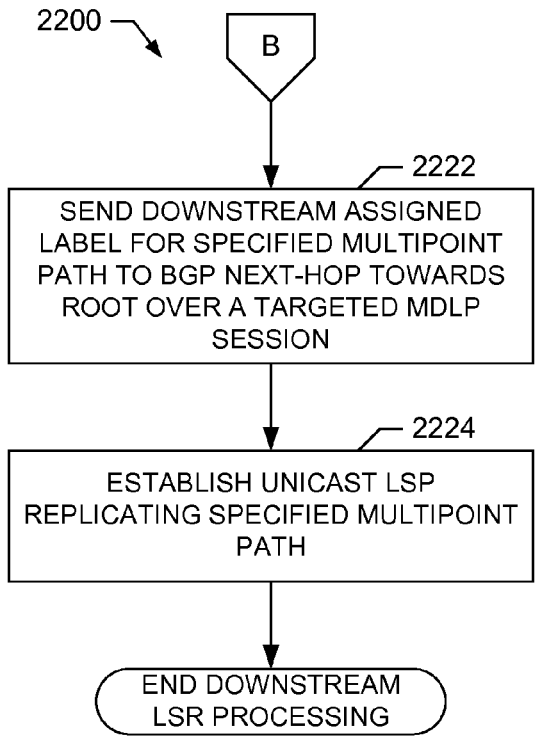
Figure 18:
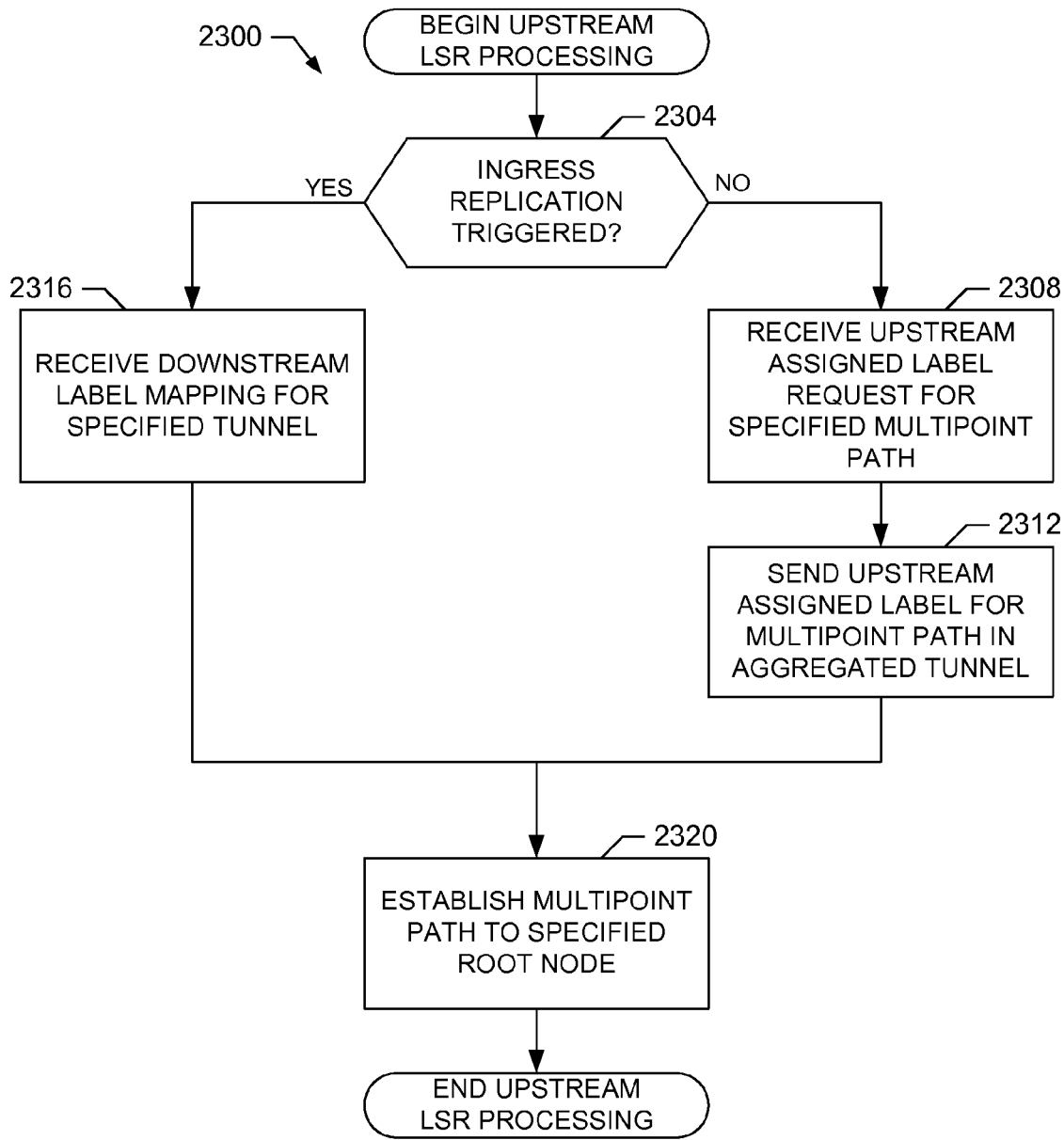
FIG. 18 is a flowchart representative of example machine readable instructions that may be executed to implement upstream ABR processing in the LSR of FIG. 3.

Example machine readable instructions 2200 that may be executed to implement downstream LSR processing in the LSR 300 of FIG. 3 are represented by the flowchart shown in FIGS. 17A-C. Execution of the machine readable instructions 2200 is described in the context of the LSR 300 implementing ABR-1 (111) or ABR-3 (113) in the provider networks 100, 200 or 1400, where appropriate. With reference to the preceding figures, the machine readable instructions 2200 begin execution at block 2202 of FIG. 17A at which the message transceiver 305 of the LSR 300 receives a downstream message to setup a multipoint communication path. For example, the downstream setup message received at block 2202 could be an mLDP label mapping message, a PIM Join message, etc., as illustrated in the message sequence diagrams of FIG. 4A-B, 5A-B, 6, 7, 9, 11A-B, 12A-B or 15.

Next, at block 2204 the downstream message processor 310 of the LSR 300 determines whether the LSR 300 is coupled to the original root node (e.g., original root PE) identified in the downstream multipoint communication path setup message received at block 2202. If the LSR 300 is not coupled to the identified original root node (block 2204), then the LSR 300 corresponds to, for example, the downstream ABR-3 (113) in the provider networks 100, 200 or 1400. As such, at block 2206 the LSR 300 (e.g., implementing ABR-3) determines whether the setup message received at block 2202 corresponds to, for example, a legacy PIM Join message that is to be converted to, for example, an mLDP message or RSVP-TE P2MP message to be sent to the next-hop upstream LSR. If legacy protocol conversion is to be performed (block 2206), then the legacy protocol convertor 325 of the LSR 300 (e.g., implementing ABR-3) converts, for example, the legacy PIM Join message received at block 2202 to an mLDP message or RSVP-TE P2MP message to be sent (e.g., via the message transceiver 305) to the next-hop upstream LSR (e.g., such as ABR-1) as illustrated in the message sequence diagrams of FIG. 9, 11A-B or 12A-B.

Next, at block 2210 the aggregation trigger 315 of the LSR 300 (e.g., implementing ABR-3) determines whether aggregation of multipoint communication paths is to be triggered. For example, such as determination may be based on any, some or all of configuration data maintained by the configuration processor 320, indicators and/or opaque value types included in the setup message received at block 2202, etc. If aggregation is not to be triggered (block 2210), then at block 2212 the packet replicator 350 of the LSR 300 (e.g., implementing ABR-3) determines whether ingress replication is to be triggered. For example, such as determination may be based on any, some or all of configuration data maintained by the configuration processor 320, indicators and/or opaque value types included in the setup message received at block 2202, etc. If ingress replication is not to be triggered (block 2212), then at block 2214 the downstream message processor 310 of the LSR 300 (e.g., implementing ABR-3) causes an mLDP message or RSVP-TE P2MP message to be sent (e.g., via the message transceiver 305) to the next-hop upstream LSR (e.g., such as ABR-1) as illustrated in the message sequence diagrams of FIG. 4A-B, 5A-B, 11A-B or 12A-B to continue building the requested individual multipoint communication path, without employing aggregation or ingress replication, towards the identified original root node. Execution of the example machine readable instructions 2200 then ends.

Returning to block 2210, if aggregation is to be triggered, then the LSR 300 (e.g., implementing ABR-3) implements aggregation according to, for example, the message sequence diagrams of FIG. 6, 7 or 9. For example, at block 2216 the downstream message processor 310 of the LSR 300 (e.g., implementing ABR-3) sends (e.g., via the message transceiver 305) an upstream label assignment request message via a targeted LDP session to the next-hop upstream LSR (e.g., such as ABR-1) towards the identified original root node. Then, at block 2218 the downstream message processor 310 of the LSR 300 receives (e.g., via the message transceiver 305) an upstream label assignment message containing the upstream-assigned label to be used to identify the inner multipoint LSP being built when it is aggregated in an outer multipoint LSP in the core network. Then, at block 2220 the downstream message processor 310 of the LSR 300 sends (e.g., via the message transceiver 305) an mLDP message or RSVP-TE P2MP message to build the outer multipoint LSP, if needed. Execution of the example machine readable instructions 2200 then ends.

Returning to block 2212, if ingress replication is to be triggered, then the LSR 300 (e.g., implementing ABR-3) implements ingress replication according to, for example, the message sequence diagram of FIG. 15. For example, at block 2222 of FIG. 17B the downstream message processor 310 of the LSR 300 sends (e.g., via the message transceiver 305) an mLDP message over a targeted LDP session to the next-hop upstream LSR (e.g., such as ABR-1) towards the identified original root node. The mLDP message sent at block 2222 contains a downstream-assigned mLDP label to identify traffic conveyed by the multipoint communication path being built. The mLDP message also includes an opaque value type (or other indicator) set to trigger ingress replication by the upstream LSR (e.g., such as ABR-1). Next, at block 2224 the downstream message processor 310 of the LSR 300 sends (e.g., via the message transceiver 305) an LDP message to build the unicast tunnel that is to carry the replicated traffic, if needed. Execution of the example machine readable instructions 2200 then ends.

Returning to block 2204 of FIG. 17A, if the LSR 300 determines that it is coupled to the identified original root PE, then the LSR 300 corresponds to, for example, the upstream ABR-1 (111) in the provider networks 100, 200 or 1400. As such, at block 2226 of FIG. 17C the LSR 300 (e.g., implementing ABR-1) determines whether the setup message received at block 2202 includes, for example, a PIM indicator that is set, thereby indicating that legacy protocol conversion is to be performed. If legacy protocol conversion is to be performed (block 2226), then the legacy protocol convertor 325 of the LSR 300 (e.g., implementing ABR-1) converts, for example, the mLDP message or RSVP-TE P2MP message received at block 2202 to a legacy PIM Join message to be sent (e.g., via the message transceiver 305) to the original root node (e.g., such as the PE2) as illustrated in the message sequence diagrams of FIG. 9, 11A-B or 12A-B. Then, at block 2230 the downstream message processor 310 of the LSR 300 (e.g., implementing ABR-1) sends (e.g., via the message transceiver 305) an appropriate downstream setup message, such as an mLDP label mapping message, a PIM Join message as determined at block 2228, etc., to the original root node (e.g., such as the PE2) as illustrated in the message sequence diagrams of FIG. 4A-B, 5A-B, 6, 7, 9, 11A-B, 12A-B or 15, to build the multipoint communication path identified in the setup message received at block 2202 of FIG. 2A. Execution of the example machine readable instructions 2200 then ends.

Example machine readable instructions 2300 that may be executed to implement the upstream LSR processing in the LSR 300 of FIG. 3 are represented by the flowchart shown in FIG. 23. Execution of the machine readable instructions 2300 is described in the context of the LSR 300 implementing ABR-1 (111) in the provider networks 200 or 1400, where appropriate. With reference to the preceding figures, the machine readable instructions 2300 begin execution at block 2304 of FIG. 18 at which the LSR 300 (e.g., implementing ABR-1) determines whether ingress replication has been triggered (e.g., based on a previously received downstream message, configuration data, etc.). If ingress replication has not been triggered (block 2304), the LSR 300 implements aggregation processing according to, for example, the message sequence diagrams of FIG. 6, 7 or 9. For example, at block 2308 the upstream message processor 330 of the LSR 300 (e.g., implementing ABR-1) receives an upstream label assignment request message via a targeted LDP session from a downstream LSR (e.g., such as ABR-3). Then, at block 2312 the tunnel aggregator 335 of the LSR 300 (e.g., implementing ABR-1) determines an upstream-assigned label to identify the inner multipoint LSP being built by the downstream LSR when the inner multipoint LSP is aggregated into an outer multipoint LSP. At block 2312, the upstream message processor 330 of the LSR 300 (e.g., implementing ABR-1) also sends (e.g., via the message transceiver 305) an upstream label assignment message containing the upstream-assigned label back to the downstream LSR (e.g., such as ABR-3).

Returning to block 2304, if ingress replication has been triggered, the LSR 300 implements ingress replication according to, for example, the message sequence diagram of FIG. 15. For example, at block 2316 the upstream message processor 330 of the LSR 300 (e.g., implementing ABR-1) receives an mLDP message over a targeted LDP session from a downstream LSR (e.g., such as ABR-3) that identifies a multipoint communication path whose traffic is to be ingress replicated and conveyed via a unicast tunnel. Then, at block 2320 the upstream message processor 330 causes the downstream message processor 310 of the LSR 300 (e.g., implementing ABR-1) to send an appropriate downstream setup message (e.g., such as an mLDP message, RSVP-TE P2MP message, PIM Join message, etc.) to continue building the multipoint communication path towards the root node (e.g., root PE router). Execution of the example machine readable instructions 2300 then ends.

Figure 19A:
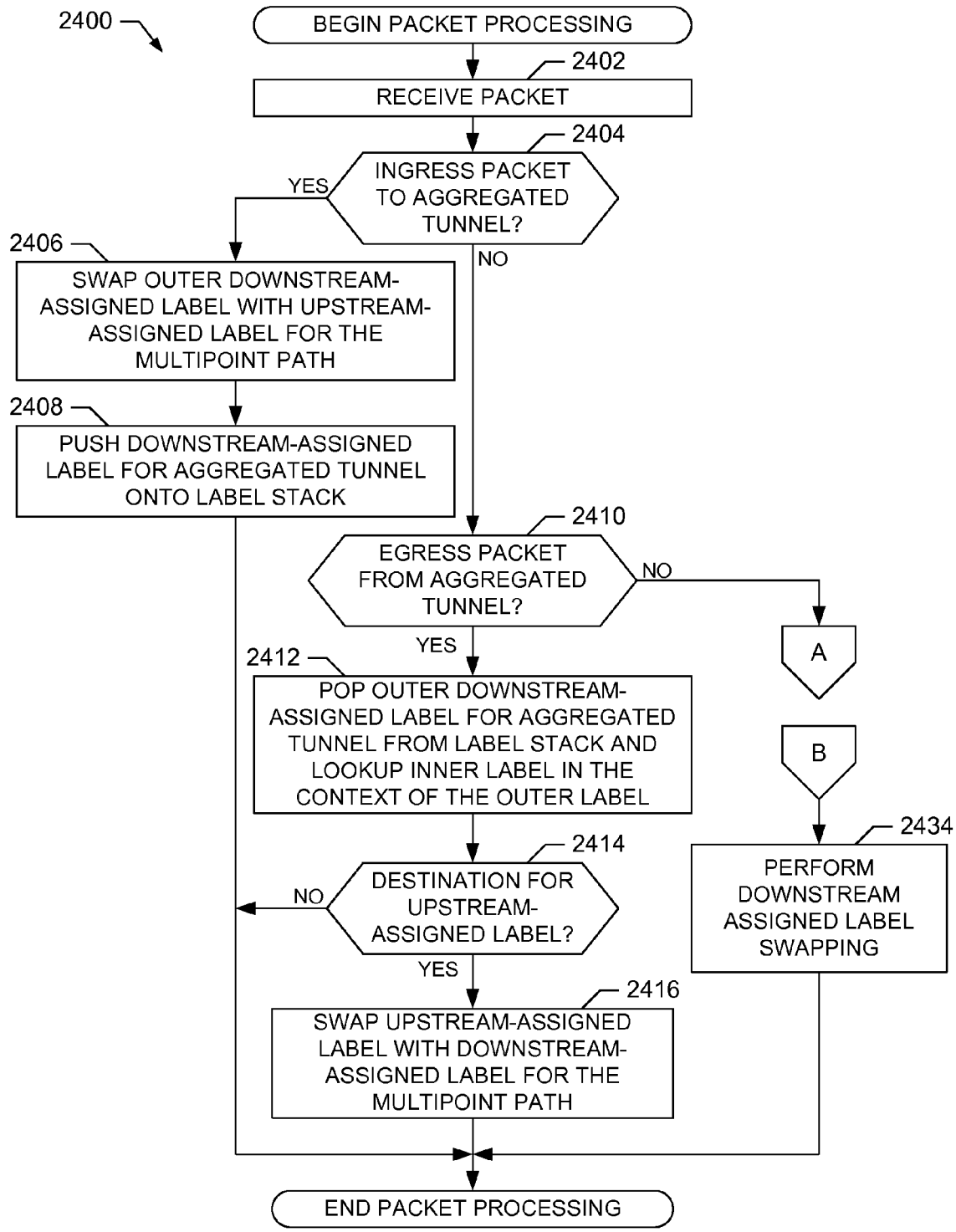
FIGS. 19A-B collectively are a flowchart representative of example machine readable instructions that may be executed to implement ABR packet processing in the LSR of FIG. 3.
Figure 19B:
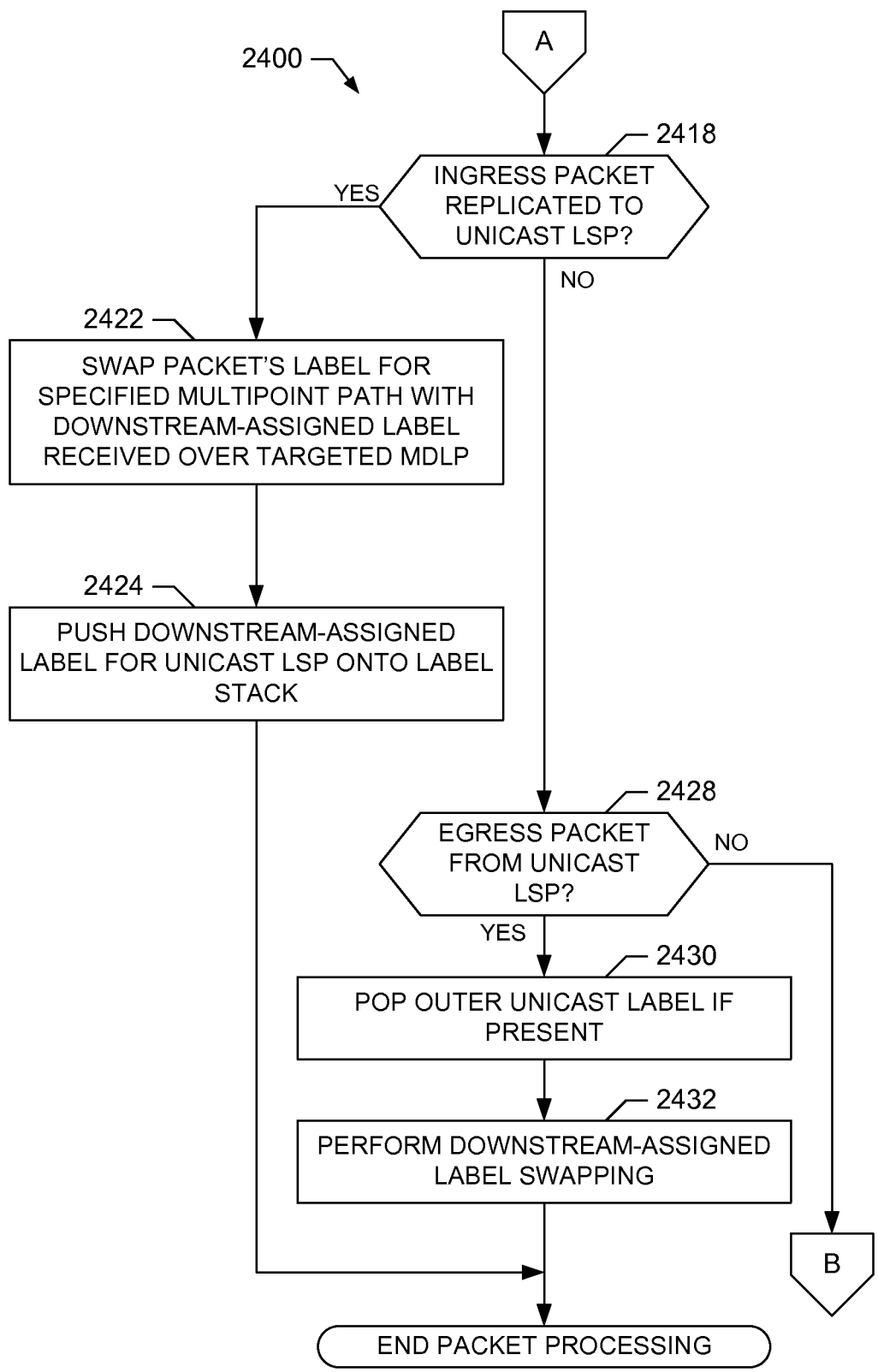

Example machine readable instructions 2400 that may be executed to implement packet forwarding in the LSR 300 of FIG. 3 are represented by the flowchart shown in FIGS. 19A-B. Execution of the machine readable instructions 2400 is described in the context of the LSR 300 implementing ABR-1 (111) or ABR-3 (113) in the provider networks 100, 200 or 1400, where appropriate. With reference to the preceding figures, the machine readable instructions 2400 begin execution at block 2402 of FIG. 19A at which the packet transceiver 340 of the LSR 300 receives a data packet containing traffic associated with a multipoint communication path. At block 2404, the LSR 300 determines whether the received data packet is an ingress packet to be aggregated onto an outer multipoint LSP. If the received data packet is an ingress packet to be aggregated onto an outer multipoint (block 2404), the LSR 300 corresponds to, for example, the upstream ABR-1 (111) of FIG. 8 or 10. Accordingly, at block 2406 the packet label swapper 345 of the LSR 300 (e.g., implementing ABR-1) swaps the outer downstream-assigned label (e.g., such as the label 804 for the inner multipoint LSP A of FIG. 8) on the received packet's label stack with an upstream-assigned label (e.g., such as the label 806 used for the inner multipoint LSP A of FIG. 8) identifying the inner multipoint LSP providing the received data packet. However, if the received packet is provided via a legacy protocol (e.g., such as PIM) that does not employ label switching, at block 2406 the packet label swapper 345 just pushes the upstream-assigned label (e.g., such as the label 806 also used for the PIM-SSM tree A of FIG. 10) onto a label stack created for the received packet. Additionally, at block 2408 the packet label swapper 345 pushes a downstream-assigned label for the outer multipoint LSP operating as an aggregation tunnel (e.g., such as the label 808 used for the outer multipoint LSP C in FIG. 8 or 10) onto the received packet's label stack. Execution of the example machine readable instructions 2400 then ends.

Returning to block 2404, if the received data packet is not an ingress packet to be aggregated onto an outer multipoint, then at block 2410 the LSR 300 determines whether the received data packet is an egress packet exiting from an aggregated tunnel. If the received data packet is an egress packet exiting from an aggregated tunnel (block 2410), the LSR 300 corresponds to, for example, the downstream ABR-3 (113) of FIG. 8 or 10. Accordingly, at block 2412 the packet label swapper 345 of the LSR 300 (e.g., implementing ABR-3) pops the outer downstream-assigned label used for outer multipoint LSP routing (e.g., such as the label 810 used for the outer multipoint LSP C in FIG. 8 or 10) from the received packet's label stack. Next, at block 2414 the packet label swapper 345 of the LSR 300 (e.g., implementing ABR-3) processes the upstream-assigned label (e.g., such as the label 806 of FIG. 8 or 10) from the received packet's label stack to determine whether any PE routers (e.g., such as PE5 or PE6) coupled to the LSR 300 (e.g., implementing ABR-3) are leaves of the inner multipoint path identified by the upstream-assigned label. If none of the PE routers coupled to the LSR 300 (e.g., implementing ABR-3) are leaves (block 2414), then the LSR 300 (e.g., implementing ABR-3) drops or otherwise ignores the received packet, and execution of the example machine readable instructions 2400 then ends. However, if at least one of the PE routers coupled to the LSR 300 (e.g., implementing ABR-3) is a leaf node (block 2414), then at block 2416 the packet label swapper 345 swaps the upstream-assigned label (e.g., such as the label 806 of FIG. 8) with a downstream-assigned label (e.g., such as the label 812 of FIG. 8 or 10) to enable the data packet to be routed towards the leaf node (e.g., such as PE6). If, however, the received packet is to be routed in the edge network via a legacy protocol (e.g., such as PIM) that does not employ label switching, at block 2416 the packet label swapper 345 just pops the upstream-assigned label (e.g., such as the label 808 of FIG. 10) from the received packet's label stack. Execution of the example machine readable instructions 2400 then ends.

Returning to block 2410, if the received data packet is not an egress packet exiting from an aggregated tunnel, then at block 2418 of FIG. 19B the LSR 300 determines whether the received data packet is an ingress packet to be ingress replicated to a unicast LSP. If the received data packet is an ingress packet to be ingress replicated (block 2418), then the LSR 300 corresponds to, for example, the upstream ABR-1 (111) of FIG. 14. Accordingly, at block 2422 the packet label swapper 345 of the LSR 300 (e.g., implementing ABR-1) swaps the outer downstream-assigned label (e.g., such as the label 1608 of FIG. 16) from the received packet's label stack for the downstream-assigned label (e.g., such as the label 1622 of FIG. 16) that was received from the downstream LSR (e.g., such as ABR-3) via the targeted LDP session. Then, at block 2424 the packet label swapper 345 pushes a downstream-assigned label for the unicast LSP (e.g., such as the label 1626 of FIG. 16) onto the received packet's label stack. Execution of the example machine readable instructions 2400 then ends.

Returning to block 2418, if the received data packet is not an ingress packet to be ingress replicated, then at block 2428 the LSR 300 determines whether the received packet is an egress replicated packet exiting from a unicast LSP. If the received packet is an egress packet exiting from a unicast LSP (block 2428), then the LSR 300 corresponds to, for example, the downstream ABR-3 (113) of FIG. 14. Accordingly, at block 2430 the packet label swapper 345 of the LSR (e.g., implementing ABR-3) pops the outer downstream-assigned label for the unicast LSP (e.g., such as the label 1624 of FIG. 16) from the received packet's label stack. Then, at block 2432 the packet label swapper 345 performs downstream-assigned label swapping (e.g., such as by swapping the label 1622 with the label 1606 as shown in FIG. 16) to continue routing the received packet to the appropriate leaf node (e.g., such as PE6). Execution of the example machine readable instructions 2400 then ends.

Returning to block 2428, if the received packet is not an egress packet exiting from a unicast LSP, then the received packet is being routed over a non-aggregated multipoint LSP. Accordingly, at block 2434 of FIG. 19A the packet label swapper 345 of the LSR 300 performs downstream-label swapping to enable the packet to be routed along the next segment of the non-aggregated multipoint LSP. Execution of the example machine readable instructions 2400 then ends.

Figure 20:
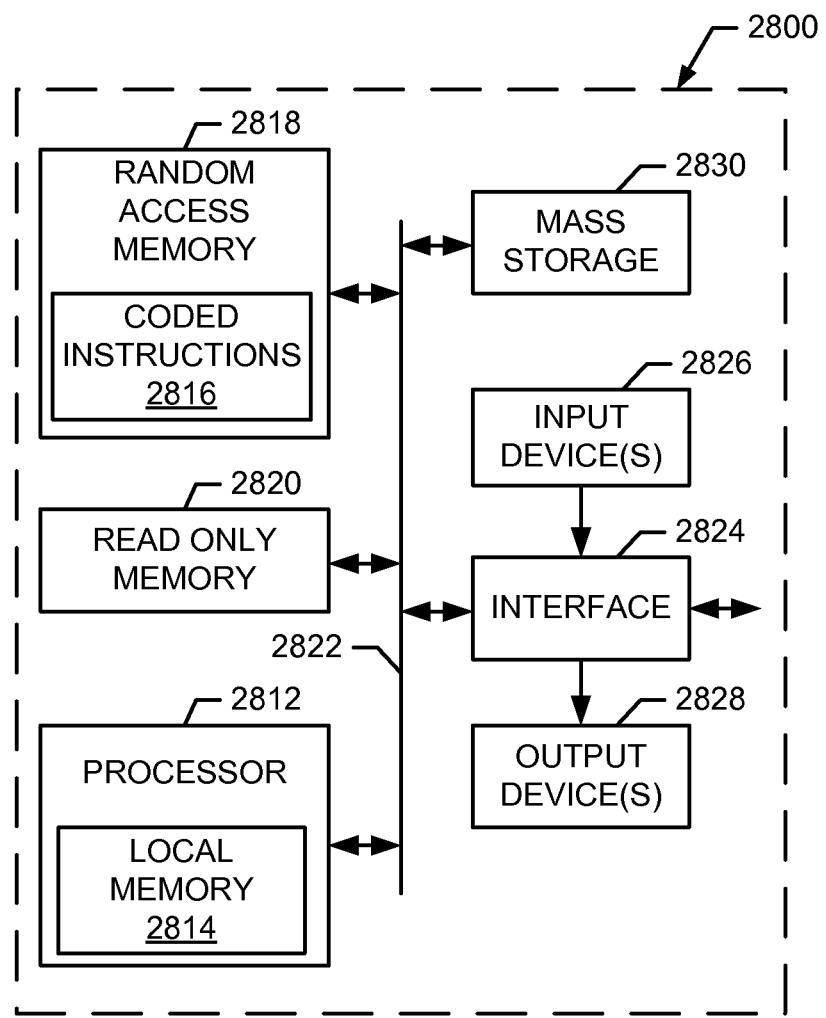
FIG. 20 is a block diagram of an example processing system that may execute the example machine readable instructions of FIGS. 17A-C, 18 and/or 19A-B to implement the LSR of FIG. 3.

FIG. 20 is a block diagram of an example processing system 2800 capable of implementing the apparatus and methods disclosed herein. The processing system 2800 can be, for example, a server, a personal computer, a personal digital assistant (PDA), an Internet appliance, a DVD player, a CD player, a digital video recorder, a personal video recorder, a set top box, or any other type of computing device.

The system 2800 of the instant example includes a processor 2812 such as a general purpose programmable processor.

The processor 2812 includes a local memory 2814, and executes coded instructions 2816 present in the local memory 2814 and/or in another memory device. The processor 2812 may execute, among other things, the machine readable instructions represented in FIGS. 17A-C, 18 and 19A-B. The processor 2812 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 2812 is in communication with a main memory including a volatile memory 2818 and a non-volatile memory 2820 via a bus 2822. The volatile memory 2818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2820 may be implemented by flash memory and/or any other desired type of memory device. Access to the main memory 2818, 2820 is typically controlled by a memory controller (not shown).

The processing system 2800 also includes an interface circuit 2824. The interface circuit 2824 may be implemented by any type of interface standard, such as an Ethernet interface, a universal serial bus (USB), and/or a third generation input/output (3GIO) interface.

One or more input devices 2826 are connected to the interface circuit 2824. The input device(s) 2826 permit a user to enter data and commands into the processor 2812. The input device(s) can be implemented by, for example, a keyboard, a mouse, a touchscreen, a track-pad, a trackball, an isopoint and/or a voice recognition system. For example, the interface circuit 2824 can interface with the configuration processor 320 of the LSR 300 to allow one or more of the input devices 2826 to be used by a user to configure the LSR 300.

One or more output devices 2828 are also connected to the interface circuit 2824. The output devices 2828 can be implemented, for example, by display devices (e.g., a liquid crystal display, a cathode ray tube display (CRT)), by a printer and/or by speakers. The interface circuit 2824, thus, typically includes a graphics driver card.

The interface circuit 2824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 2800 also includes one or more mass storage devices 2830 for storing software and data. Examples of such mass storage devices 2830 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to aggregate multipoint communication paths, the method comprising:
    sending, using a processor, an upstream label assignment request to an upstream router in response to receiving a first downstream message for building a first inner multipoint communication path between a root node identified in the first downstream message and a leaf node originating the first downstream message, the first downstream message including an opaque value type set to a first value that is to trigger the sending of the upstream label assignment request; and
    receiving, using the processor, an upstream-assigned label from the upstream router in response to the upstream label assignment request, the upstream-assigned label to identify the first inner multipoint communication path among a plurality of inner multipoint communication paths conveyed via an outer multipoint communication path aggregating the plurality of inner multipoint communication paths, wherein the first downstream message comprises a downstream-assigned label to identify the first inner multipoint communication path, and the method further comprises:
    determining whether a label stack included with a packet conveyed via the outer multipoint communication path contains the upstream-assigned label; and
    when the label stack contains the upstream-assigned label, swapping the upstream-assigned label with the downstream-assigned label to forward the packet to the leaf node.

2. The method as defined in claim 1 wherein the method further comprises:
    receiving the packet conveyed via the outer multipoint communication path.

3. The method as defined in claim 1 further comprising, when the label stack does not contain the upstream-assigned label, discarding the packet.

4. The method as defined in claim 1 wherein the first downstream message comprises a recursive multicast label distribution protocol message including a forwarding equivalency class identifying the root node and the upstream router as the next-hop towards the root node, the forwarding equivalency class also including the opaque value type set to the first value that is to trigger the sending of the upstream label assignment request.

5. The method as defined in claim 1 further comprising sending the upstream label assignment request and receiving the upstream-assigned label via a targeted label distribution protocol session established with the upstream router.

6. The method as defined in claim 1 further comprising sending a second downstream message to build the outer multipoint communication path, the second downstream message identifying the upstream router as a root of the outer multipoint communication path.

7. The method as defined in claim 1 wherein the outer multipoint communication path and the first inner multipoint communication path are label switched paths, the outer multipoint communication path resides in a core network, and wherein the method further comprises using a first protocol to build the outer multipoint communication path in the core network and a second protocol different from the first protocol to build a portion of the first inner multipoint communication path residing outside the core network.

8. The method as defined in claim 7 wherein the first protocol is a multicast label distribution protocol and the second protocol is a protocol independent multicast source-specific-multicast protocol, the first downstream message comprises a protocol independent multicast join message identifying the root node as a source of an source-specific-multicast channel, and the method further comprises processing configuration information to determine whether to send the upstream label assignment request in response to receiving the protocol independent multicast join message.

9. A tangible machine readable storage medium comprising machine readable instructions which, when executed, cause a machine to perform operations comprising:
    sending an upstream label assignment request to an upstream router in response to receiving a first downstream message for building a first inner multipoint communication path between a root node identified in the first downstream message and a leaf node originating the first downstream message, the first downstream message including an opaque value type set to a first value that is to trigger the sending of the upstream label assignment request; and
    receiving an upstream-assigned label from the upstream router in response to the upstream label assignment request, the upstream-assigned label to identify the first inner multipoint communication path among a plurality of inner multipoint communication paths conveyed via an outer multipoint communication path aggregating the plurality of inner multipoint communication paths, wherein the first downstream message comprises a downstream-assigned label to identify the first inner multipoint communication path, and the operations further comprise:

determining whether a label stack included with a packet conveyed via the outer multipoint communication path contains the upstream-assigned label; and when the label stack contains the upstream-assigned label, swapping the upstream-assigned label with the downstream-assigned label to forward the packet to the leaf node.

10. The tangible machine readable storage medium as defined in claim 9 wherein the operations further comprise: receiving the packet conveyed via the outer multipoint communication path.

11. The tangible machine readable storage medium as defined in claim 9 wherein the first downstream message comprises a recursive multicast label distribution protocol message including a forwarding equivalency class identifying the root node and the upstream router as the next-hop towards the root node, the forwarding equivalency class also including the opaque value type set to the first value that is to trigger the sending of the upstream label assignment request.

12. The tangible machine readable storage medium as defined in claim 9 wherein the operations further comprise sending a second downstream message to build the outer multipoint communication path, the second downstream message identifying the upstream router as a root of the outer multipoint communication path.

13. The tangible machine readable storage medium as defined in claim 9 wherein the outer multipoint communication path and the first inner multipoint communication path are label switched paths, the outer multipoint communication path resides in a core network, and wherein the operations further comprise using a first protocol to build the outer multipoint communication path in the core network and a second protocol different from the first protocol to build a portion of the first inner multipoint communication path residing outside the core network.

14. The tangible machine readable storage medium as defined in claim 13 wherein the first protocol is a multicast label distribution protocol and the second protocol is a protocol independent multicast source-specific-multicast protocol, the first downstream message comprises a protocol independent multicast join message identifying the root node as a source of an source-specific-multicast channel, and the operations further comprise processing configuration information to determine whether to send the upstream label assignment request in response to receiving the protocol independent multicast join message.

15. A label switch router comprising:
a packet transceiver to receive a packet conveyed via an outer multipoint communication path;
a memory having machine readable instructions stored thereon; and
a processor to execute the instructions to perform operations comprising:
determining whether a label stack included with the packet contains an upstream-assigned label assigned by an upstream label switch router to identify a first inner multipoint communication path aggregated in the outer multipoint communication path, the first inner multipoint communication path established between a root node and a leaf node, the leaf node served by the label switch router; and
in response to determining that the label stack contains the upstream-assigned label, swapping the upstream-assigned label with a first downstream-assigned label assigned by the leaf node to forward the packet to the leaf node.

16. The label switch router as defined in claim 15 wherein the operations further comprise discarding the packet when the first inner multipoint communication path is not associated with any nodes served by the label switch router.

17. The label switch router as defined in claim 15 wherein the operations further comprise:
sending an upstream label assignment request to an upstream router in response to receiving a first downstream message including the first downstream-assigned label from the leaf node to build the first inner multipoint communication path; and
receiving the upstream-assigned label from the upstream router in response to the upstream label assignment request, the upstream-assigned label to identify the first inner multipoint communication path among a plurality of inner multipoint communication paths aggregated via the outer multipoint communication path.

18. The label switch router as defined in claim 17 wherein the first downstream message comprises a recursive multicast label distribution protocol message including a forwarding equivalency class identifying the root node and the upstream router as the next-hop towards the root node, the forwarding equivalency class also including an opaque value type set to a first value to trigger sending of the upstream label assignment request, and wherein the operations further comprise sending the upstream label assignment request in response to determining that the opaque value type is set to the first value.

19. The label switch router as defined in claim 17 wherein the operations further comprise sending the upstream label assignment request and receiving the upstream-assigned label via a targeted label distribution protocol session established with the upstream router.

20. The label switch router as defined in claim 17 wherein the operations further comprise sending a second downstream message to build the outer multipoint communication path, the second downstream message identifying the upstream router as the root of the outer multipoint communication path.

\* \* \* \* \*